US007206559B2

(12) United States Patent
Meade, II

(10) Patent No.: US 7,206,559 B2
(45) Date of Patent: Apr. 17, 2007

(54) SYSTEM AND METHOD FOR A MOBILE COMPUTING DEVICE TO CONTROL APPLIANCES

(75) Inventor: William K. Meade, II, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 815 days.

(21) Appl. No.: 09/982,247

(22) Filed: Oct. 16, 2001

(65) Prior Publication Data

US 2003/0073412 A1 Apr. 17, 2003

(51) Int. Cl.
*H04B 1/18* (2006.01)

(52) U.S. Cl. .............................. 455/151.1; 455/151.2; 455/352; 455/3.03; 455/41.2

(58) Field of Classification Search ............ 455/151.1, 455/151.2, 352, 353, 3.03, 418, 419, 41.2
See application file for complete search history.

(56) References Cited

U.S. PATENT DOCUMENTS 4,301,542 A * 11/1981 Weintraub et al. .......... 455/353
4,634,845 A 1/1987 Hale et al.
4,689,478 A 8/1987 Hale et al.
5,268,666 A * 12/1993 Michel et al. ......... 340/310.06
5,321,737 A * 6/1994 Patsiokas ................. 455/426.1
5,559,313 A 9/1996 Claus et al.
5,579,239 A * 11/1996 Freeman et al. ......... 348/14.01
5,590,038 A 12/1996 Pitroda
5,710,605 A 1/1998 Nelson
5,775,357 A 7/1998 Regna et al.
5,867,386 A 2/1999 Hoffberg et al.
5,875,108 A 2/1999 Hoffberg et al.
5,889,506 A * 3/1999 Lopresti et al. ............. 345/158
5,901,246 A 5/1999 Hoffberg et al.
5,903,454 A 5/1999 Hoffberg et al.
5,920,477 A 7/1999 Hoffberg et al.
5,920,848 A 7/1999 Schutzer et al.
5,991,410 A 11/1999 Albert et al.
6,002,558 A * 12/1999 Rines et al. ................ 360/137
6,018,724 A 1/2000 Arent
6,026,375 A 2/2000 Hall et al.
6,081,750 A 6/2000 Hoffberg et al.
6,161,134 A 12/2000 Wang et al.
6,195,589 B1 2/2001 Ketcham
6,208,975 B1 3/2001 Bull et al.
6,317,039 B1 * 11/2001 Thomason .................. 340/505
6,379,058 B1 * 4/2002 Petteruti et al. .............. 400/76
6,400,996 B1 6/2002 Hoffberg et al.

(Continued)

FOREIGN PATENT DOCUMENTS

EP 0435370 7/1991

(Continued)

*Primary Examiner*—Matthew Anderson
*Assistant Examiner*—Minh Dao

(57) ABSTRACT

An appliance control system of the present invention comprises an appliance and a mobile computing device configured for controlling the appliance by at least one of determining an available content for the appliance, selecting the content used by the appliance, and applying user preferences to the appliance.

A method of controlling an appliance of the present invention comprises establishing a wireless communication link between an appliance and a mobile computing device, and controlling the appliance with the mobile computing device includes at least one of determining an available content for the appliance, selecting the content used by the appliance, and applying user preferences to the appliance.

1 Claim, 13 Drawing Sheets

U.S. PATENT DOCUMENTS

| | | | | |
|---|---|---|---|---|
| 6,418,424 | B1 | 7/2002 | Hoffberg et al. | |
| 6,434,403 | B1 * | 8/2002 | Ausems et al. | 455/556.2 |
| 6,453,167 | B1 * | 9/2002 | Michaels et al. | 455/466 |
| 6,624,828 | B1 * | 9/2003 | Dresevic et al. | 715/771 |
| 6,640,145 | B2 | 10/2003 | Hoffberg et al. | |
| 6,813,619 | B2 * | 11/2004 | Devara | 707/10 |
| 2001/0032127 | A1 * | 10/2001 | Lewis | 705/14 |
| 2002/0033760 | A1 * | 3/2002 | Kobayashi | 340/825.52 |
| 2002/0129368 | A1 | 9/2002 | Schlack et al. | |

FOREIGN PATENT DOCUMENTS

| | | |
|---|---|---|
| GB | 2345368 | 7/2000 |
| WO | WO98/20678 | 5/1998 |
| WO | WO01/69567 | 9/2001 |
| WO | WO02/067587 | 8/2002 |

* cited by examiner

SYSTEM AND METHOD FOR A MOBILE COMPUTING DEVICE TO CONTROL APPLIANCES

CROSS REFERENCE TO RELATED APPLICATIONS

This patent application is related to the following Non-Provisional U.S. patent applications Ser. No. 09/982,218, entitled "Mobile Computing Device With Method and System for Interrupting Content Performance Among Appliances,"; Ser. No. 09/981,434, entitled "System And Method For Automatically Applying A User Preference From A Mobile Computing Device To An Appliance,"; Ser. No. 09/981,771, entitled "System and Method for Determining Priority Among Multiple Mobile Computing Devices to Control an Appliance," are all assigned to the same assignee as the present application, and are all herein incorporated by reference.

FIELD OF THE INVENTION

The present invention relates to mobile computing devices, and in particular, to mobile computing devices that control appliances.

BACKGROUND OF THE INVENTION

Man has always tried to control his environment. In the last century, man has succeeded in producing totally controlled indoor environments complete with water, light, heating and cooling, sanitary plumbing, and entertainment. We live quite comfortably.

In the last twenty years, the advent of the remote control has further spoiled us. We are disappointed if we cannot point and click to control something. We have separate remote controls for our TVs, stereos, and lights, as well as universal remote controls to permit controlling all these appliances with a single device.

While a remote control can help you navigate a favorites list for TV programming, the favorites list is created through and maintained by the cable or satellite broadcaster, not the remote control. Accordingly, conventional remote controls are limited to assisting a user select content for viewing within the framework already provided by the TV signal broadcaster (e.g. network, cable, satellite, etc). This fact makes the term remote control somewhat misdescriptive since they actually control very little in terms of content. Rather, the conventional remote control merely allows us to select among content that is already chosen for us.

Finally, to the extent that any of our favorite media devices, such as radios, TVs, internet browsers/appliances, etc. permit personalization through favorite lists or user preferences, the information in these devices remain islands unto themselves. Users constantly re-enter favorites and preferences in these devices because it is not currently possible to carry them across devices. Moreover, when a user desires to use a device, such as a TV or web browser on a computer, in a new location such as a hotel room or friend's house, the user no longer has access to their favorites and user preferences which are stored on the same type of device (e.g. TV or web browser) at home.

Accordingly, the personalized use of one electronic device remains isolated and independent of personalized use of other electronic devices available to the user.

SUMMARY OF THE INVENTION

An appliance control system of the present invention comprises an appliance and a mobile computing device configured for controlling the appliance by at least one of determining an available content for the appliance, selecting the content used by the appliance, and applying user preferences to the appliance.

A method of controlling an appliance of the present invention comprises establishing a wireless communication link between an appliance and a mobile computing device, and controlling the appliance with the mobile computing device including at least one of determining an available content for the appliance, selecting the content used by the appliance, and applying user preferences to the appliance.

DESCRIPTION OF THE PREFERRED EMBODIMENTS

Figure 1:
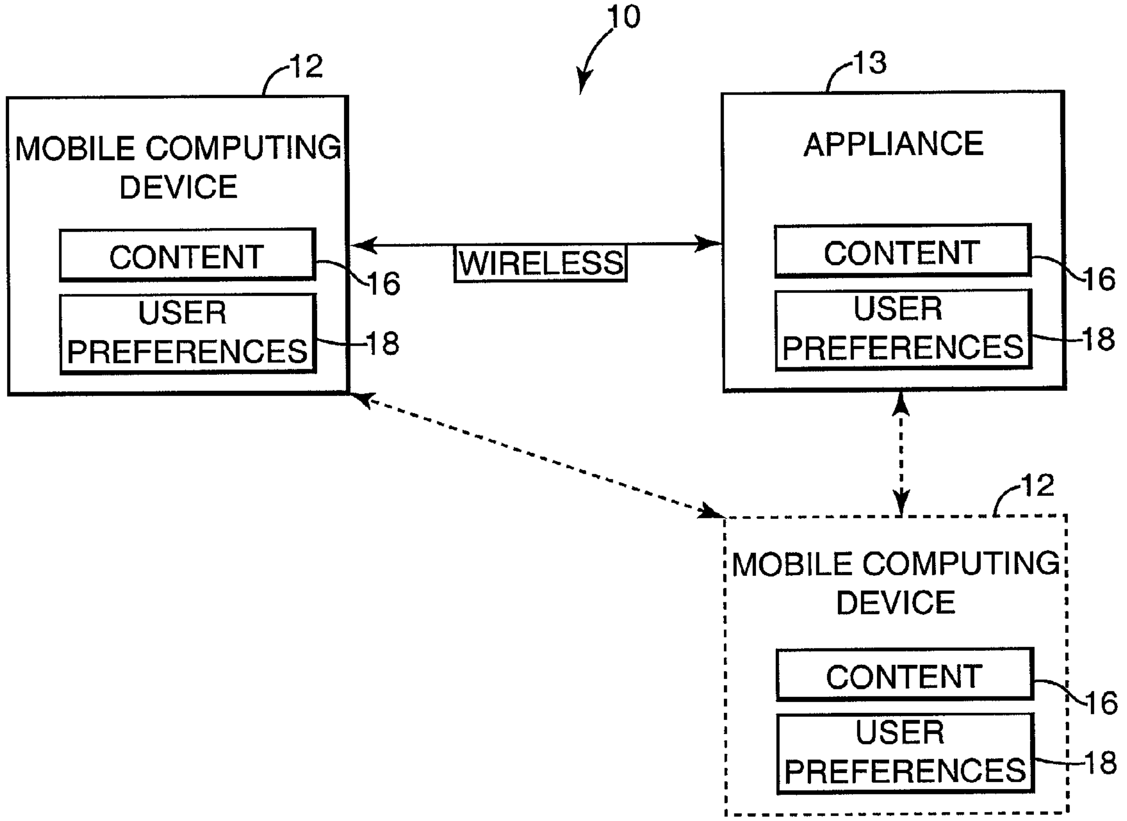
FIG. 1 is a block diagram illustrating an appliance control system, according to one embodiment of the present invention.

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Components of the wireless access control method and system of the present invention can be implemented in hardware via a microprocessor, programmable logic, or state machine, in firmware, or in software within a given device. In one aspect, at least a portion of the software programming is web-based and written in HTML and JAVA programming languages, including links to graphical user interfaces for data collection, such as a windows based operating system, and each of the main components may communicate via a network using a communication bus protocol. For example, the present invention may or may not use a TCP/IP protocol suite for data transport. Other programming languages and communication bus protocols suitable for use with the present invention will become apparent to those skilled in the art after reading the present application. Components of the present invention may also reside in software on one or more computer-readable mediums. The term computer-readable medium as used herein is defined to include any kind of memory, volatile or non-volatile (e.g., floppy disks, hard disks, CD-ROMs, flash memory, read-only memory (ROM), and random access memory (RAM)).

Preferably, the user interfaces described herein run on a controller, computer, appliance or other device having an operating system which can support one or more applications. The operating system is stored in memory and executes on a processor. The operating system is preferably a multi-tasking operating system which allows simultaneous execution of multiple applications, although aspects of this invention may be implemented using a single-tasking operating system. The operating system employs a graphical user interface windowing environment which presents the applications or documents in specially delineated areas of the display screen called "windows." Each window has its own adjustable boundaries which allow the user to enlarge or shrink the application or document relative to the display screen. Each window can act independently, including its own menu, toolbar, pointers, and other controls, as if it were a virtual display device. Other software tools may be employed via the window, such as a spreadsheet for collecting data. The operating system preferably includes a windows-based dynamic display which allows for the entry or selection of data in dynamic data field locations via an input device such as a keyboard and/or mouse. One preferred operating system is a Windows® brand operating system sold by Microsoft Corporation. However, other operating systems which provide windowing environments may be employed, such as those available from Apple Corporation or IBM. In another embodiment, the operating system does not employ a windowing environment.

An appliance control system of the present invention enables a mobile computing device, such as a personal digital assistant, to control appliances like televisions, radios, printers, etc. The control can take several forms including applying preferences to the appliance such as volume level, activation and deactivation along with determining the content available to the appliance such as supplying a program, song, or file to be acted upon by the appliance. In addition, control can include simply selecting available content to be used by the appliance, such as selecting a TV channel or regularly broadcast program.

For example, upon entry within a room, the mobile computing device can automatically perform these steps: identify an appliance like a TV; activate the TV; turn the TV to a channel carrying a favorite program; and select a preferred volume level. In the event that the favorite program is not being broadcast, the mobile computing device can supply its own content. In particular, the mobile computing device can retrieve an episode of that program or substitute a program from memory of the mobile computing device, transfer that stored program to the TV, and then command the appliance to play the program.

Of course, the mobile computing device contains user preferences for all devices that the user might come into contact with and optionally contains virtually any content that the user might desire to have performed by an appliance. Moreover, control by the mobile computing device is not necessarily limited to appliances owned by the user. Rather, appliances situated in public places, at friends and neighbors homes, etc. can selectively surrender control to a mobile computing device. Accordingly, the user now gains unified control over appliances in their environment, whether at home or out in the world, with a single mobile computing device that permits automatic implementation of their user preferences and automatic performance of their preferred content on the appliances.

With the system and method of the present invention, consumers are no longer relegated to seeking and implementing their preferences and preferred content subject to control by the appliances and subject to the content providers associated with the appliances. Rather, with the system and method of the present invention, the user obtains integrated control over the appliances, becoming the master of the appliances. These subservient appliances become tools to perform tasks using content supplied by the mobile computing device or conventionally supplied by an appliance content provider.

Moreover, user preferences and content that was previously isolated among independent appliances becomes centralized in the mobile computing device and associated with the user. After all, user preferences and content were created for the enjoyment of the user in the first place. Accordingly, the system and method of the present invention keeps the user preferences (and some content) with the user via the mobile computing device instead of with the appliances, letting the user apply the preferences when and where they desire to do so without independent programming of each device regarding those preferences.

An appliance control system 10, according to one exemplary embodiment of the present invention, is shown in FIG. 1. Appliance control system 10 includes at least one mobile computing device 12 operating in an environment of one or more appliances 13 in which mobile computing device 12 controls appliance 13. Both mobile computing device 12 and appliance 13 include content 16 and user preferences 18. Content 16 generally includes a song, program, or any information that can be performed in a task by appliance 13 while user preference 18 generally includes preferences as to how, when and where that content 16 will be performed by appliances 13. Both content 16 and user preferences 18 are further defined throughout this application in the following examples of the system and method of the present invention.

Mobile computing device 12 is configured to select content 16 of appliance 13 for performance by appliance 13 and/or configured to supply content 16 from mobile computing device 12 (or from another source as controlled by mobile computing device 12) to appliance 13 for performance by appliance 13. Finally, controlling appliance 13 includes applying user preferences 18, stored on mobile computing device 12, to each appliance 13.

As shown in FIG. 1, more than one mobile computing device 12 can compete for control over appliance 13. In this situation, mobile computing device 12 and appliance 13 determine priority between multiple computing devices 12 for control of appliance 13, as will be described in greater detail later in this application. The mobile computing device 12 that obtains priority to control appliance 13 also optionally can request, command, and/or coordinate another mobile computing device 12 to copy and/or transfer, all or a part, of its content 16 to appliance 13 and/or to the controlling mobile computing device 12.

Figure 2:
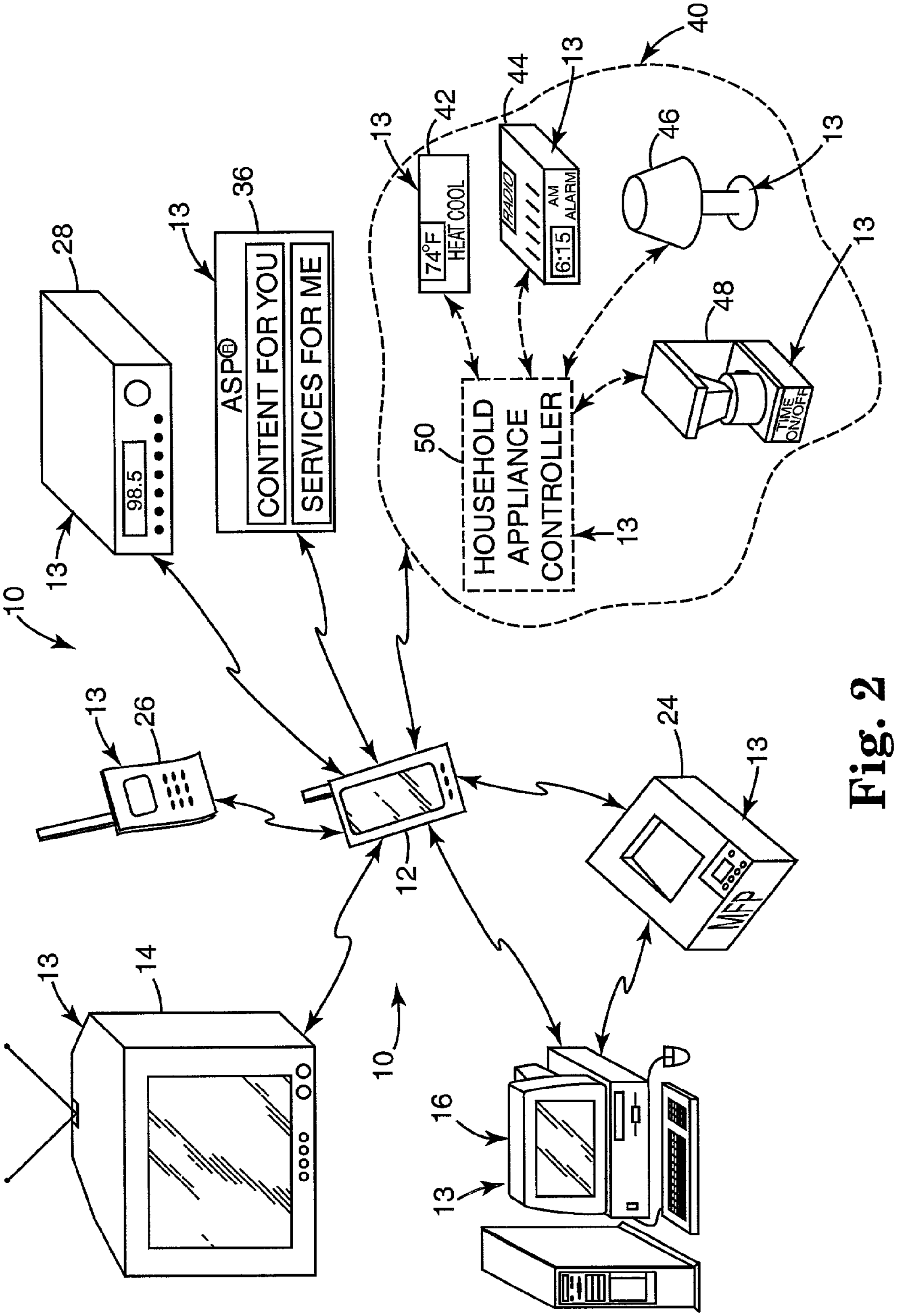
FIG. 2 is a diagram further illustrating an appliance control system, according to one embodiment of the present invention.

As shown in FIG. 2, appliances 13 in appliance control system 10 include, but are not limited to, video device 14, computing workstation 16, multifunction printer 24, mobile phone 26, audio device 28, and web site 36. Appliance control system 10 further comprises household appliance set 40, which includes heating and cooling thermostat 42, alarm clock 44, lighting unit 46, and beverage maker 48. Appliance set 40 also optionally includes conventional household appliance controller 50, which acts an appliance 13, for providing local control over household appliances 42–48. Each of these appliances 13 and their interaction with mobile computing device 12 as part of appliance control system 10 is described in further detail in association with FIGS. 3–10.

Figure 3:
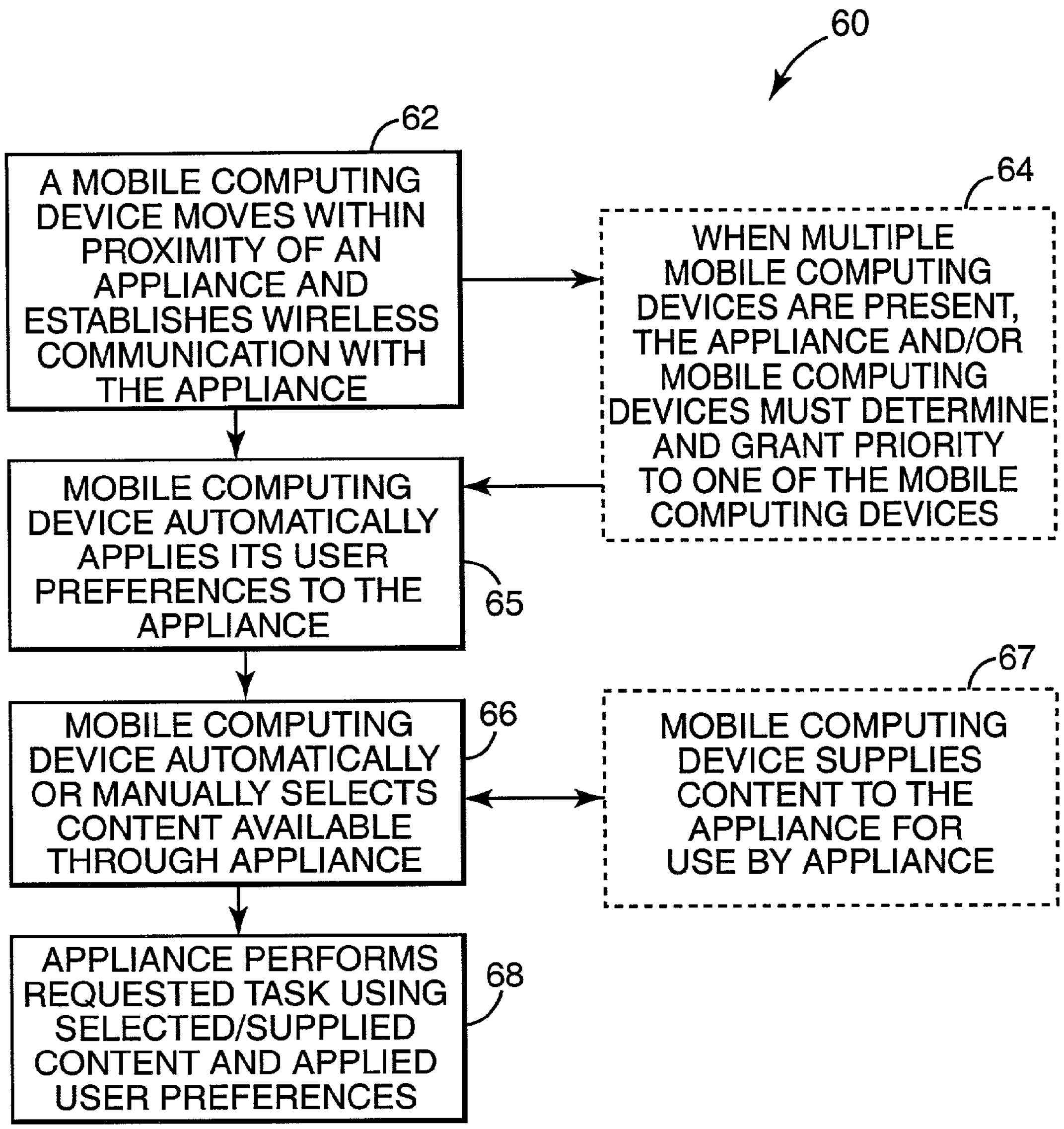
FIG. 3 is a flow diagram of a method of controlling an appliance, according to one embodiment of the present invention.

Appliance control system 10 is used in a method 60 of controlling appliances, as shown in FIG. 3. Method 60 includes a first step 62 in which mobile computing device 12 moves within proximity of at least one appliance 13 and establishes wireless communication with appliance 13. First step 62 optionally includes mobile computing device 12 selecting which appliances 13 it will attempt to assert control over.

When multiple computing devices are present, then first step 62 further includes step 64 in which appliances 13 and/or mobile computing devices 12 must determine priority and grant priority of control over appliances 13 to one of the mobile computing devices 12. Next, the master mobile computing device 12 automatically applies its user preferences to appliance 13 (step 65). Mobile computing device 12 then automatically or manually selects content available through appliance 13 for performance on appliance 13 (step 66). Step 66 also optionally includes mobile computing device 12 supplying content to appliance 13 for performance by appliance 13 (step 67).

Finally, in step 68, appliance 13 performs the task requested by mobile computing device 12 using content 16 selected and/or supplied by mobile computing device 12 along with the user's preferences 18 applied by mobile computing device 12 to appliance 13.

System 10 and method 60 of the present invention will now be described in further detail in association with FIGS. 4–10, with specific details regarding the interaction of mobile computing device 12 and each of appliances 13 shown and identified in association with FIG. 2.

For example, each appliance 13 in household appliance set 40 (FIG. 2) may be controlled according to user preferences 18 of mobile computing device 12. When user with mobile computing device 12 comes within the proximity if appliance set 40, then mobile computing device 12 preferably causes appliance set 40 to adopt operating conditions preferred by the user. In particular, by applying user preferences 18, mobile computing device 12 sets thermostat 42 at a selected temperature and heating/cooling cycle, sets radio 44 at a favorite station, volume and alarm time, sets lighting 46 at a favorite on/off cycle and intensity level, and sets beverage maker 48 at a favorite on/off cycle. Finally, mobile computing device 12 optionally controls household appliance controller 50, which in turn controls one or more appliances 13 in household appliance set 40. Accordingly, mobile computing device 12 carries user preferences 18 of the user's ideal living environment so that mobile computing device 12 automatically controls the surrounding environment using available appliances 13 to accommodate the user tastes.

Figure 4:
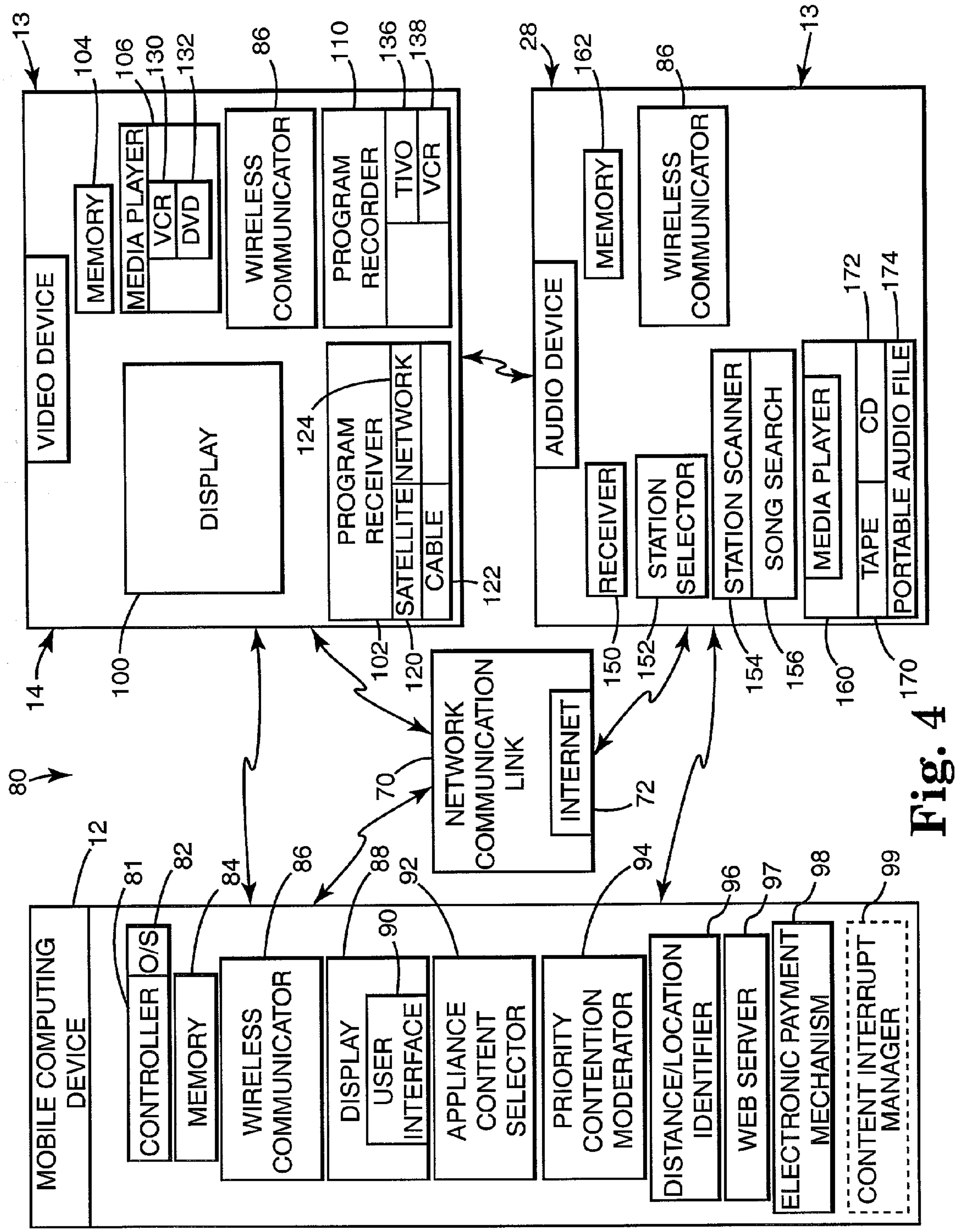
FIG. 4 is a block diagram of a video device, an audio device, and mobile computing device of an appliance control system, according to one embodiment of the present invention.

In another aspect of the invention, as shown in FIG. 4, an appliance control system of the present invention includes audiovisual subsystem 80 comprising mobile computing device 12 interacting with appliances 13, such as video device 14 and audio device 28. Subsystem 80 is not a closed system excluding the interaction of other appliances 13 or mobile computing devices 12 but rather a convenient reference to identify an exemplary interaction between mobile computing device 12, video device 14, and audio device 28.

Video device 14 preferably includes a television, movie player, or video display monitor while audio device 28 preferably includes a stereo system, CD player, or other audio media player. Mobile computing device 12 preferably includes a personal digital assistant, or another computing device such as a handheld computer, laptop computer, etc.

In this embodiment, appliance control subsystem 80 also optionally includes network communication link 70. Network communication link 70, as used herein, includes an Internet communication link, an intranet communication link, or similar high-speed communication link. In one preferred embodiment, network communication link 70 includes Internet communication link 72. Network communication link 70 optionally facilitates communication between mobile computing device 12 and appliances 13, such as video device 14 and audio device 28, and provides a route to the internet for obtaining content for performance by appliances 13 under the control of mobile computing device 12. For audio device 28 this feature would include the ability to obtain audio files such as portable audio files (e.g., MP3, Windows Metafile, etc.) from the web site 36 for performance on audio device 28.

Mobile computing device 12 includes controller 81 with operating system 82, memory 84, wireless communicator 86, display 88 with user interface 90, appliance content selector 92, priority contention moderator 94, distance/location identifier 96, embedded web server 97, electronic payment mechanism 98, and content interrupt manager 99.

Controller 81 of mobile computing device 12 includes hardware, software, firmware or combination of these. In one preferred embodiment controller 81 includes a computer server or other microprocessor based system capable of performing a sequence and logic operation and including memory for storing information. Controller 81 supports and cooperates with embedded web server 97. Operating system 82 preferably has the attributes and features of the previously described operating systems.

Memory 84 of mobile computing device 12 preferably includes a high capacity random access memory system available on an integrated circuit chip, such as SDRAM, DRAM, EDO RAM, etc. Memory 84 also optionally comprises a miniaturized hard drive sized for disposition within mobile computing device 12 or a silicon based, ultra high capacity storage device, such as an atomic resolution storage device, as described in Gibson et. al. U.S. Pat. No. 5,557,596, and which is hereby incorporated by reference.

Wireless communicator 86 of mobile computing device 12 uses one or more known communication and application protocols such as Wireless Application Protocol (WAP), Bluetooth, Infrared (IrDA, FIR), 802.11, as well as other communication and application protocols known to those skilled in the art, such as UltraWideBand (UWB). Mobile computing device 12 includes communication hardware and software known in the art for implementing these protocols, such as distance/location identifier 96. Distance/location identifier 96 also optionally incorporates or communicates with a global positioning satellite system (GPS) to provide these functions. Distance/location identifier 96 determines the location and distance of appliances 13 relative to mobile computing device 12 for establishing authorization and priority of mobile computing device(s) 12 to control appliances 13.

Wireless communication protocols such as infrared (e.g., FIR), Bluetooth, and UltraWide Band (UWB) which permit direct radio or beamed communication between two or more compatible devices that operate independently of a network and independently of network communication link 70. This feature permits direct one-on-one communication between two similarly configured computing devices without any communication intermediary. In the example of the Bluetooth protocol, the communication link preferably is established by the mere presence of each respective device (e.g., mobile computing device 12 and any appliance having a wireless communicator 86) in close proximity to each other. This instant synchronization enables the devices to immediately communicate with each other without taking time to manually establish a connection or communication link. Finally, if necessary, mobile computing device 12 also can communicate with other mobile computing devices 12 and/or appliances 13 through more conventional indirect routes such as wired or wireless network links, wired or wireless Internet links, or telecommunications networks.

User interface 90 of mobile computing device 12 can be implemented in hardware via a microprocessor, programmable logic device, or state machine, and firmware, or in software. In one aspect, at least a portion of the software programming is optionally written in Java programming language, and user interface 90 optionally communicates with other mobile computing devices 12 and/or appliances 13 (FIG. 1) via network communication link 70 using a communication bus protocol. For example, the present invention optionally can use a TCP/IP protocol suite for data transport. In another aspect, the present invention does not use a TCP/IP protocol suite for data transport. Other programming languages and communication bus protocols suitable for use with user interface 90 and appliance control system 10 will be apparent to those skilled in the art, such as ultrawideband (UWB), Bluetooth, and infrared (e.g. FiR), as described in association with wireless communicator 86. User interface 90 is described in further detail in association with FIGS. 5 and 9.

Appliance content selector 92 of mobile computing device 12 operates in association with user interface 90 to determine what content is used or performed by appliance 13 (FIG. 1) and where that content is obtained. Appliance content selector 92 also operates in association with content interrupt manager 99 of mobile computing device 12 to control how and when that content is used or performed by appliance 13 on behalf of the user. Appliance content selector 92 is described in further detail in association with FIG. 5.

Priority contention moderator 94 of mobile computing device 12 is brought into play to sort priority when more than one mobile computing device 12 seeks to control a given appliance 13. Priority sorting is required since appliance control system 10 is an open system in which multiple mobile computing devices 12 can compete for control over one or more appliances 13 in one or more appliance environments. Priority contention moderator 94 is described in further detail in association with FIG. 10.

Finally, embedded web server 97 of mobile computing device 12 produces a web page accessible through Internet communication link 72 for accessing functions of mobile computing device 12, such as content 16 and user preferences 18 (FIG. 1). Embedded web server 97 preferably is implemented using techniques such as those described in U.S. Pat. No. 6,170,007, titled EMBEDDING WEB ACCESS FUNCTIONALITY INTO A DEVICE FOR USER INTERFACE FUNCTIONS and U.S. patent, titled EMBEDDING WEB ACCESS MECHANISM IN AN APPLIANCE FOR USER INTERFACE FUNCTIONS INCLUDING A WEB SERVER AND WEB BROWSER, which are both hereby incorporated by reference.

Electronic payment mechanism 98 of mobile computing device 12, in cooperation with wireless communicator 86, permits mobile computing device 12 to perform electronic financial transactions including sending and receiving payments for goods and services.

Figure 6:
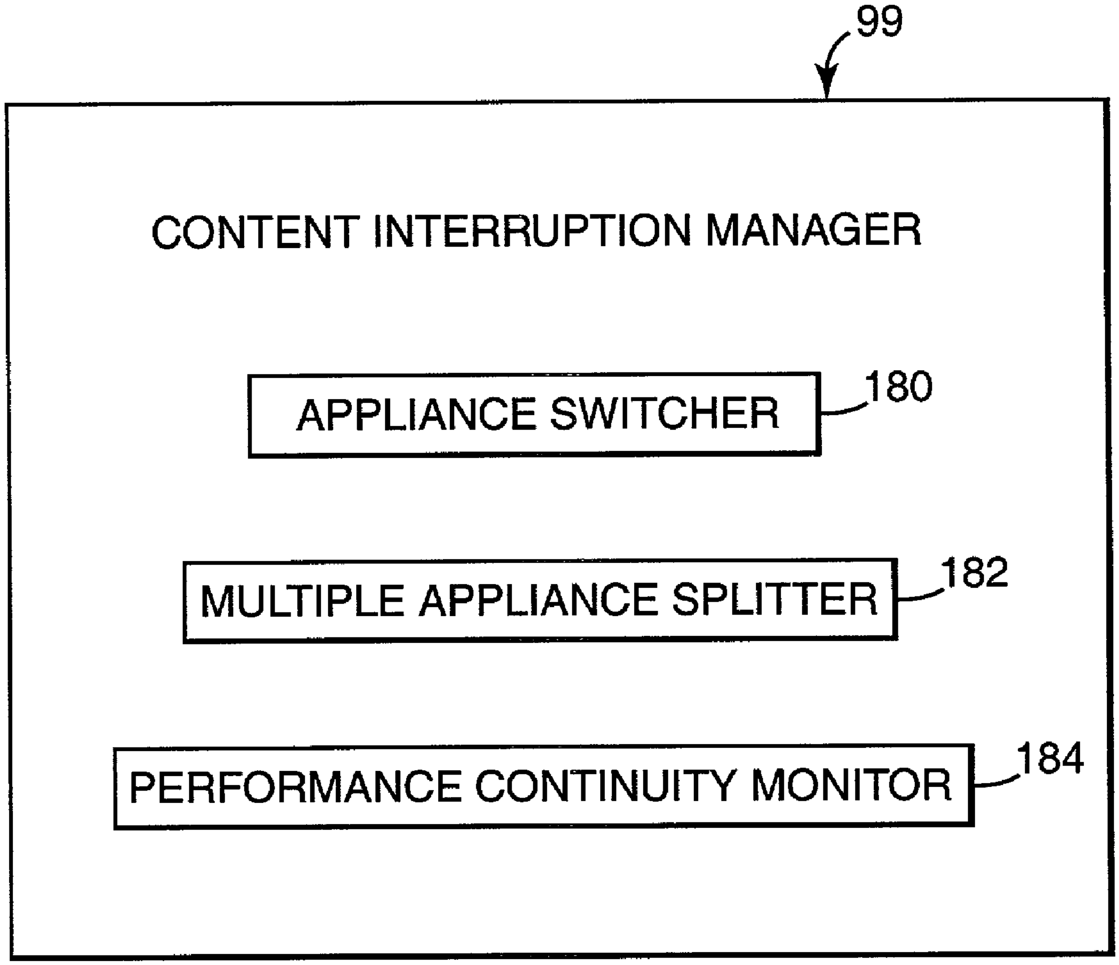
FIG. 6 is a block diagram of a content interrupt manager of an appliance control system, according to one embodiment of the present invention.

Finally, content interrupt manager 99 of mobile computing device 12 selectively controls how and when content 16 is performed on one or more appliances 13 using one or more media (e.g., video, audio, etc.), and is described in greater detail in association with FIG. 6.

With these features, mobile computing device 12 is configured to select content 16 and/or supply content 16, along with user preferences 18, for performing content 16 on appliances 13, such as video device 14 and audio device 28.

As further shown in FIG. 4, video device 14, which acts an appliance 13 to mobile computing device 12, includes display 100, program receiver 102, memory 104, media player 106, wireless communicator 86, and program recorder 110. Program receiver 102 includes satellite function 120, cable function 122 and network function 124 for obtaining video-based programs from various sources, respectively, such as a satellite TV programming signal (e.g. DirecTV), a cable TV programming signal, and a broadcast network programming signal (e.g., NBC network TV). Memory 104 interacts and communicates with other components of video device 14 to store and implement user preferences 18 and content 16 (FIG. 1), as instructed by mobile computing device 12. Media player 106 further includes VCR capability 130 and DVD capability 132 for playing content from external mobile media sources such as videotape movies and/or DVD movies. Wireless communicator 86 facilitates wireless communication with mobile computing device 12 and other suitable devices. Program recorder 110 includes TIVO capability 136 and VCR capability 138 for obtaining and playing recorded video as well as for recording video content. Finally, video device 14 need not include all of the components of video device 14 shown in FIG. 2.

Audio device 28 includes receiver 150, station selector 152, station scanner 154 with song search function 156, media player 160, memory 162 and wireless communicator 86. Media player 160 further includes tape function 170, CD function 172, and portable audio file format function 174 for respectively playing audiotapes, CDs, and portable audio format music files (e.g. MP3, Windows Metafile Format (WMF), etc).

Receiver 150 of audio device 28 comprises a tuner configured for receiving radio broadcasts and for playing recorded audio files from CDs, audiotapes, etc. Station selector 152 permits selection of radio stations while station scanner 154 permits scanning the full radio dial for stations while song search function 156 searches the available radio stations for songs that are preferred by the user. Memory 162 allows a user to store lists as user preferences 18 and/or as content 16 (FIG. 1) to identify favorite songs, programs, stations etc. in receiver 150 so that a user can more readily access favorite content 16. In addition, memory 162 also stores songs, programs, etc. as content 16 for replay at a later time as specified by the user.

Using some or all of these functions and features described in association with FIG. 4, mobile computing device 12 controls video device 14 and audio device 28 to perform content 16 according to user preferences 18. In particular, as a user carrying mobile computing device 12 approaches video device 14, such as a TV, and audio device 28, such as a stereo system, wireless communicator 86 of mobile computing device 12 establishes communication with wireless communicator of audio device 28 and/or video device 14. If appliance 13 is not currently activated, then mobile computing device 12 automatically activates that appliance 13 at the discretion of the user as determined by user preferences 18 of mobile computing device 12.

For the greatest convenience, mobile computing device 12 already includes in its user preferences 18 (stored in memory 84) a listing of the user's favorite TV programs, movies, TV stations, radio stations, radio programs, songs (including multiple renditions), as well as comprehensive program listings for TV and/or radio. Mobile computing device 12 also preferably includes in its content 16 (stored in memory 84), a library of TV programs, movies, songs, or any other content that can be performed by video device 14 and/or audio device 28. Armed with this information, mobile computing device 12 automatically applies its user preferences 18 and content 16 (via appliance content selector 92) to video device 14 and audio device 28. However, the automatic copying of user preferences 18 and content 16 optionally includes an undo function to optionally reverse the copying process in the event that preferences are erroneously copied between multiple mobile computing devices 12 and/or between mobile computing device 12 and appliances 13.

Audio device 28 and video device 14 respond to the controlling action of mobile computing device 12 by attempting to perform any requested task using content 16 according to applied user preferences 18. Since mobile computing device 12 has full and/or selective access to, and control over, all features of audio device 28 including receiver 150, station selector 152, station scanner 154, song search function 156, media player 160, memory 162, any or all of these features are available to mobile computing device 12 to carry out a selected task.

For example, for audio device 28, one user preference 18 from mobile computing device 12 identifies a single radio station as a favorite station (e.g. 98.5 FM, KTIS or National Public Radio) so that mobile computing device 12 commands station selector 152 of audio device 28 (via wireless communicator 86) to select the user's favorite station. On a broader level, user preferences 18 and/or content 16 of mobile computing device 12 that are applied to appliance 13 preferably includes a play list of preferred songs, programs, so that song search function 156 can search for real time radio broadcasts for any of those songs or programs and then turn station selector 152 to a station currently playing the favorite song or program. Moreover, if a user's favorite program (e.g. All Things Considered) is not being currently broadcast, then mobile computing device 12 optionally informs the user of the time that the program will be broadcast.

Alternatively, a user can manually cause a favorite song or program to be played on audio device 28. The user can command station selector 152 with mobile computing device 12 to select a desired station, or use song search 156 to search the dial for a favorite song. The user also can also manually supply a copy of a favorite song to audio device 28 for performance by the audio device 28 using an portable audio file stored in memory 84 of mobile computing device 12. In this case, mobile computing device 12 not only selects the content to be performed by audio device 28, but also supplies the content to audio device 28. This latter process of supplying content to an appliance 13, such as audio device 28 can also take place automatically.

Of course, many other arrangements are possible between audio device 28 and mobile computing device 12 in which mobile computing device 12 selects the content performed on audio device 28 as well as optionally supplying the content. Both selected and supplied content are used to perform tasks by the appliance 13 according to user preferences 18 automatically applied to audio device 28 from mobile computing device 12.

In another example, mobile computing device 12 has full and/or selective access to, and control over, any or all of the features and functions of video device 14 including program receiver 102, memory 104, media player 106, and program recorder 110. Using any or all of these features, mobile computing device 12 uses video device 14 to perform content 16 while applying user preferences 18 of mobile computing device 12.

Video device 14 preferably is automatically activated and displays the user's favorite TV channel or network. Mobile computing device 12 also optionally transfers its video-related content (e.g., movies, TV programs, etc.) along with preferred play lists from its memory 84 into memory 104 of video device 14. Mobile computing device 12 is then free to select any desired content 16 that is currently being broadcast or supplied from memory 84,104 for performance by video device 14.

Supplying a copy of video-related content from video device 14 is optionally performed in association with TIVO capability 136. Moreover, if the TIVO portion of video device 14 has a program or show that is not on the user's play list on mobile computing device 12, then that program is downloaded from video device 14 to memory 84 of mobile computing device 12.

In short, mobile computing device 12 automatically or manually selects content 16 performed on video device 14 as well as optionally supplying content 16. Content 16 available on video device 14 also can be downloaded into mobile computing device 12.

Finally, mobile computing device 12 also optionally automatically coordinates control of audio device 28 and video device 14 so that if the user chooses to watch video device 14, then audio device 28 can be deactivated, or even activated to augment video device 14 in performing the selected content. Simply put, since mobile computing device 12 can control any appliance 13, mobile computing device 12 controls each appliance 13 with regard to, and in association with, control of other appliances 13. The coordination of performance of content 16 between and among multiple appliances 13 will be described in greater detail in association with FIG. 6 regarding content interrupt manager 99.

The selection of content 16 by mobile computing device 12 to be performed by appliance 13 is primarily achieved with appliance content selector 92, which is available through user interface 90. With user interface 90, appliance content selector 92 permits addition, deletion and modification as well as activation of content selections by mobile computing devices 12 for each appliance 13. Some of the functions of appliance content selector 92 have already been described in association with video device 14 and audio device 28.

Figure 5:
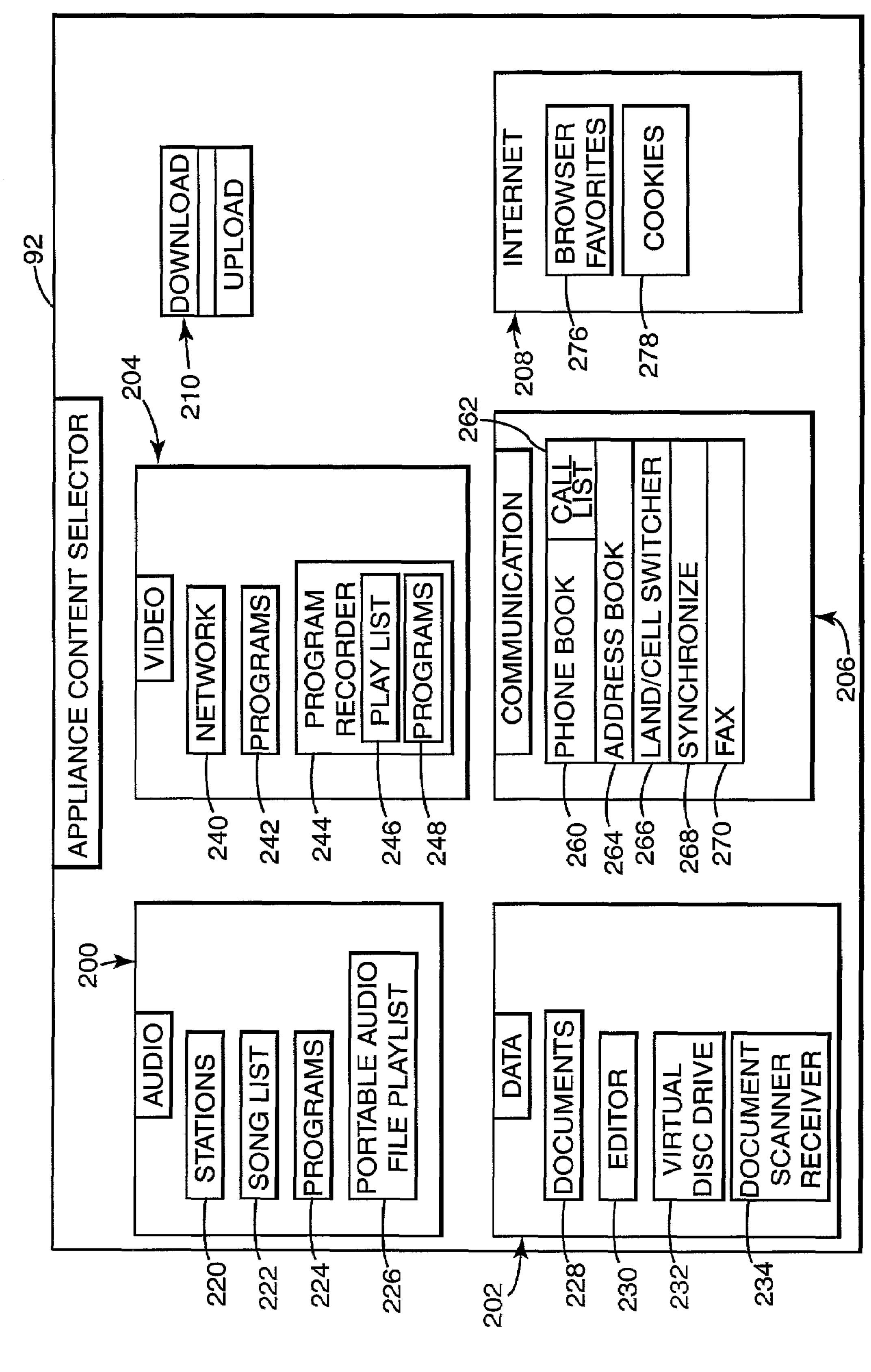
FIG. 5 is a block diagram of an appliance content selector of an appliance control system, according to one embodiment of the present invention.

As shown in FIG. 5, appliance content selector 92 of mobile computing device 12 includes audio monitor 200, data monitor 202, video monitor 204, communication monitor 206, Internet function 208, and upload/download function 210. Each monitor 200–208 includes several functions relating to user preferences 18 and content 16 to be applied to the respective types of appliances 13. All functions of appliance content selector 92 are applied automatically unless the user optionally bypasses a particular function. For each monitor 200–208 of appliance content selector 92, all selected functions and features are preferably stored in memory 84 as user preferences 18. However, to the extent necessary for performing content 16, some selected functions and features may require storage in memory 84 as content 16.

Audio monitor 200 of appliance content selector 92 includes stations function 220, song list function 222, programs function 224 and portable audio file playlist function 226. Using these functions 220–226 of audio monitor 200, a user uses mobile computing device 12 to specify the audio content, in the form of lists of stations, songs, programs and portable audio files, that are to be performed on audio device 28, and any other suitable appliances 13. For example, stations function 220 maintains a listing of favorite radio stations while song list function 222 maintains a list of favorite songs that can be played from a radio station, CD, or portable audio file (e.g., MP3, Windows Metafile Format, etc.). Activation of stations function 220 in audio monitor 200 will cause any listed preferred stations to be selected for performance by audio device 28. Programs function 224 maintains a list of favorite audio programs such as radio or TV talk shows, speeches, regularly scheduled programs (e.g. All Things Considered on National Public Radio). Finally, portable audio file playlist function 226 maintains a list of all portable audio file owned by or available to the user. Activation of any or all of these functions 220–226 of audio monitor 200 results in the selected content 16 being performed by audio device 28.

Video monitor 204 includes network function 240, program function 242, program recorder 244 with play list function 246 and program function 248. Using these functions 240–248 of video monitor 204, a user uses mobile computing device 12 to specify the video content, in the form of lists of networks and programs (including movies) that are to be performed on video device 14, and any other suitable appliances 13. Network function 240 maintains a favorite list of TV broadcast, cable or satellite networks. Upon activation of network function 240, any program being broadcast by a selected network(s) is performed on video device 14. Program function 242 maintains a list of video and/or TV programs that can be selected for viewing on video device 14. Finally, using subfunctions playlist function 246 and program function 248, program recorder 244 specifies desired recording of programs to be recorded from TV (and other sources) as well as designating playback of those recorded programs.

The content identified in the various functions of audio monitor 200 and/or video monitor 204 can either be supplied from a content provider (e.g. television broadcast network, radio, cable, or satellite), memory 84 of mobile computing device 12 (see FIG. 4), memory 162 of audio device 28, and/or memory 104 of video device 14 (FIG. 4).

As further shown in FIG. 5, communication monitor 206 of appliance content selector 92 assists mobile computing device 12 in monitoring and controlling communications among telecommunication devices such as phones and fax machines. Communication monitor 206 includes phone book function 260 with call list 262, address book function 264, land/cell phone switch function 266, synchronize function 268, and fax function 270. Phone book function 260 causes a list of phone numbers with recent call lists 262 in mobile computing device 12 to be applied to a communications appliance such as mobile phone 26 (see FIG. 2). Similarly, address book function 264 includes address information stored in mobile computing device 12 for application and transfer to mobile phone 26 (FIG. 2).

As further shown in FIG. 5, land/cell switch function 266 of communications monitor 206 selectively causes automatic switching between a cell phone (wireless digital) and a land-line phone during an ongoing telephone call (via a call forwarding function). This feature will be described later in further detail in association with FIG. 7. Synchronize function 268 causes communication features, such as phone books and address books, of multiple appliances to be synchronized relative to one another. Finally, fax function 270 permits fax receipt and transmission via mobile computing device 12.

Data monitor 202 of appliance content selector 92 assists mobile computing device 12 in monitoring and controlling data operations using computers and Internet resources. As shown in FIG. 5, data monitor 202 includes documents function 228, editor function 230, virtual disc drive function 232, and document scanner receiver function 234. Documents function 228 permits printers, such as multi-function printer 24 (FIG. 2) to print specified documents from mobile computing device 12. Editor function 230 permits documents and files on mobile computing device 12 to be edited by an appliance such as computing workstation 16 (FIG. 2) while virtual disc drive function 232 causes mobile computing device 12 to act substantially the same as an internal disc drive of computing workstation 16. Document scanner receiver function 234 facilitates mobile computing device 12 in receiving scanned document files from a scanner or even from a Digital Sender (available from Hewlett-Packard, Inc.).

As further shown in FIG. 5, internet monitor 208 of appliance content selector 92 includes web browser favorites 276 (i.e., bookmarks) and cookies 278 so that this information in mobile computing device 12 is automatically applied to computing workstation 16 (FIG. 2). Internet monitor 208 includes the function of browser favorites 276 optionally being automatically applied and/or downloaded from mobile computing device 12 to all appliances 13, while mobile computing device 12 automatically receives updates to browser favorites from computing workstation 16 or other sources. Accordingly, browser favorites function 276 coordinates and maintains an updated, synchronized list of browser favorites among mobile computing device 12 and appliances 13. Finally, upload/download function causes respective uploading and/or downloading of files and programs, as user preference 18 and/or content 16, between appliances 13 and mobile computing device 12.

In summary, appliance content selector 92 comprises an aspect of user interface 90 of mobile computing device that is devoted to supplying and selecting content for performance on appliances 13.

In another aspect of the system and method of the present invention, mobile computing device 12 optionally includes a content interrupt manager 99 (FIG. 4) for selectively controlling how and when content is performed on one or more appliances involving one or media (audio, video, etc.). Content interrupt manager 99 is further shown in FIG. 6 and includes appliance switcher 180, multiple appliance splitter 182, and performance continuity monitor 184.

Appliance switcher 180 causes content that is being performed on one appliance 13 to be switched to being performed on another appliance 13 as mobile computing device 12 moves from appliance 13 to appliance 13. For example, a user can watch a movie on a first video device 14 (FIG. 2) in one room and then move to another room having a second video device 14 to continue watching the movie. Using appliance switcher 180, the movie stops playing on the first video device 14 and begins playing on the second video device 14 as mobile computing device 12 moves between the respective video devices 14. Mobile computing device 12, through appliance switcher 180 initiates and directs the appliance switching.

Performance continuity monitor 184 tracks the performance of content 16 to substantially preserve continuity in the performance of content 16 (such as the movie) during the switch between the respective appliances 13 (such as video devices 14). For example, performance continuity monitor 184 also optionally permits the user to terminate performance of content when leaving one appliance 13, such as the first video device 14, and then resume playing the content at the same place within the content on another appliance 13, such as second video device 14. The performance can be resumed immediately so that between the two appliances, the movie never stops playing, or the performance on the second video device can be delayed until a later point in time so that there is a break in the performance. Moreover, performance continuity monitor 184 optionally can cause the performances to overlap so that the performance on the second video device begins with the last thirty seconds (or other time period) of content that were performed on the first video device. Appliance switcher 182, in coordination with performance continuity monitor 184, also optionally causes the movie to continue being performed on the first video device 14 while the movie starts playing on the second video device 14 so that the movie is played on both the first and second video devices without interruption in the content being performed.

Multiple appliance splitter 182 coordinates different media aspects of the same content or related content to be performed simultaneously on multiple appliances 13. For example, multiple appliance splitter 182 coordinates performance of the video component of a football game on video device 14 while performing an independent radio broadcast of the same football game on audio device 28. In this case, the user identifies in its user preferences 18 that when watching a football game, they prefer listening to a radio broadcast of the event while watching the same football game on video device 14. Accordingly, mobile computing device 12 uses these preferences 18 to select both audio and video content to be performed together or independently on audio device 28 and/or video device 14. In this arrangement, mobile computing device 12 directs two independent sources of content (a radio broadcast and a television broadcast) of a single event, a football game, to performed simultaneously in parallel with each other on two independent appliances 13, video device 14 and audio device 28.

In another example, multiple appliance splitter 182 cooperates with performance continuity monitor 184 to cause different aspects of a single content to be performed simultaneously by multiple appliances. In particular, some content such as a movie has both more than one type of media components, such as video and audio. The audio portion can be separated from the video portion with the audio portion being performed on a first media-type device such as audio device 28 or video device 14, and the video portion being performed on a second type media device such as video device 14.

For example, in applying user preferences 18, mobile computing device 12 can selectively direct audio device 28, such as a stereo or radio to begin playing the audio portion of a movie. The audio portion is performed with or without the video portion of the movie being played on an available video device 14. The audio portion of the movie can be played on audio device 28 wholly on its own, or after a switch from the entire movie (both video and audio portions) being performed on video device 14. Using this feature, a single content is interrupted into different aspects and performed to provide a cross media experience in which some of the content is performed on appliances 13 not previously associated with the conventional performance of content 16. In another example, a radio broadcast of a football game is performed through the audio system of video device 14 while a television broadcast is performed on the video screen of video device 14.

Accordingly, content interrupt manager 99 facilitates mobile computing devices 12 in directing performance of a single content or multiple, related content among and across multiple appliances 13 simultaneously and/or separated in time.

Figure 7:
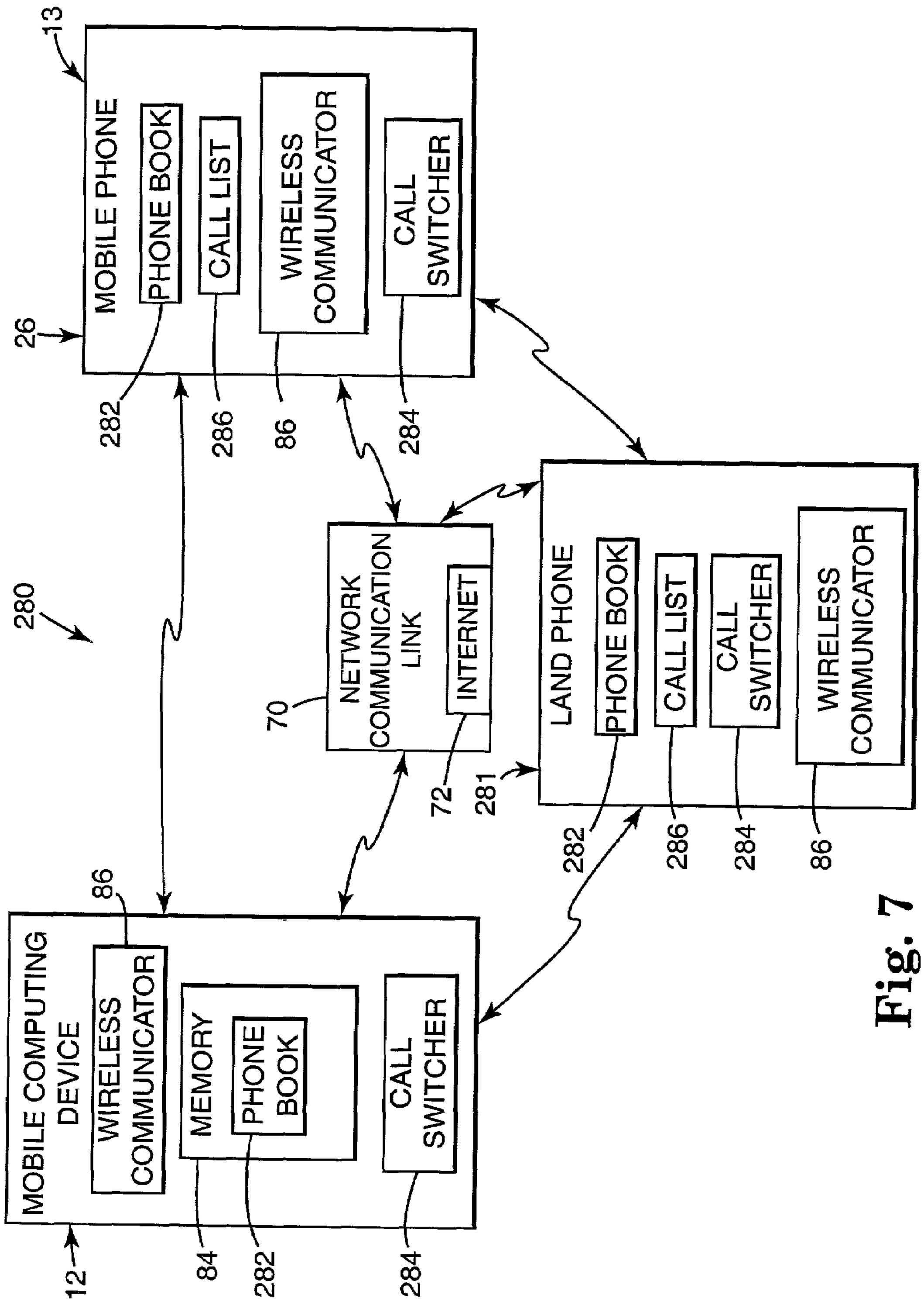
FIG. 7 is a block diagram of a mobile phone, a land-line phone, and a mobile computing device of an appliance control system, according to one embodiment of the present invention.

As shown in FIG. 7, in another aspect of the invention, an appliance control system of the present invention includes telecommunications subsystem 280 having mobile computing device 12, and telecommunication appliances 13 including mobile phone 26 and land phone 281. Subsystem 280 is not a closed system but merely a representation of just one of many combinations of appliances 13, such as telecommunication devices, that interact with mobile computing device 12 in a method and system of the present invention. Moreover, in one aspect, telecommunications subsystem 280 operates together with, or as part of, content interrupt manager 99 of mobile computing device 12 to manage switching an ongoing telephone call between multiple telecommunication appliances 13.

Mobile computing device 12 includes the same attributes and features as described in association with FIGS. 1–6 including previously described wireless communicator 86. In addition, mobile computing device 12 further includes phone book 282 in memory 84 and call switcher 284. Both mobile phone 26 and land-line phone 281 include phone book 282, call list 286, wireless communicator 86 and call switcher 284. Call switcher 284 operates in direct cooperation with, and/or as part of, appliance switcher 180 of content interrupt manager 99 (FIG. 6) of mobile computing device 12. In one aspect of mobile computing device 12, call switcher 284 optionally is completely integrated into appliance switcher 180 of mobile computing device 12.

Phone book 282 holds the user's phone numbers, names and addresses of contacts while call switcher 284 enables switching between different types of telecommunication devices (e.g., cell phone, land-line phones, etc) during on-going phone calls. Call list 286 contains a list of recently called persons and phone numbers. Both phone book 282 and call list 286 are preferably stored and handled as user preferences 18 in memory 84 of mobile computing device 12 and as user preferences 18 in telecommunication appliances 13 including mobile phone 26 and land phone 281.

In use, mobile computing device 12 automatically or manually copies the contents of its phone book 282 into phone book 282 of mobile phone 26. Similarly, a recent call list 286 in mobile phone 26 is automatically downloaded into phone book 282 of mobile computing device 12. Moreover, as preferably initiated and controlled by mobile computing device 12, call list 286 of mobile phone 26 is automatically downloaded into call list 286 and phone book 282 of land-line phone 281 as the user approaches land-line phone 281. This procedure optionally occurs when the user is participating in an ongoing telephone call on mobile phone 26 and approaches land-line phone 281 for the purpose of switching from mobile phone 26 to land-line phone 281. In conventional systems, the user would hang up mobile phone 26 and then call their contact with land-line phone 281 in a separate phone call to complete the call with land-line phone 281.

However, with the system and method of the present invention, at the direction of call switcher 284 of mobile computing device 12, an ongoing phone call is automatically transferred from mobile phone 26 to land-line phone 281 during the on-going call (via a call forwarding function). While call switcher 284 manages the switch between respective telecommunication appliances 13, such as phones 26 and 281, performance continuity monitor 184 of content interrupt manager 99 of mobile computing device 12 (FIG. 6) acts to maintain the continuity of the on-going phone call, which effectively constitutes content 16 being performed by phones 26 and 281. During the switch, the most recent call list 286 of mobile phone 26 is optionally copied to land-line phone 281 for availability for the next phone call. In addition, during and/or after the switch, call switcher 284 optionally activates a voice mail function and/or ringer off function on the phone line that is not currently in use (has just been switched off) so that a second phone call is not received during the on-going phone call.

If the phone call is terminated prematurely during the automatic switching between mobile phone 26 and land-line phone 281, then at the direction of mobile computing device 12, mobile phone 26 and/or land-line phone 281 can selectively or automatically initiate a call to re-establish the telephone call between the two most recent devices that were communicating. If necessary, call switcher 284 of mobile computing device 12 directs the original devices (i.e., the telecommunication appliances 13 that started the first phone call before the interruption) to re-initiate telecommunication.

Figure 8:
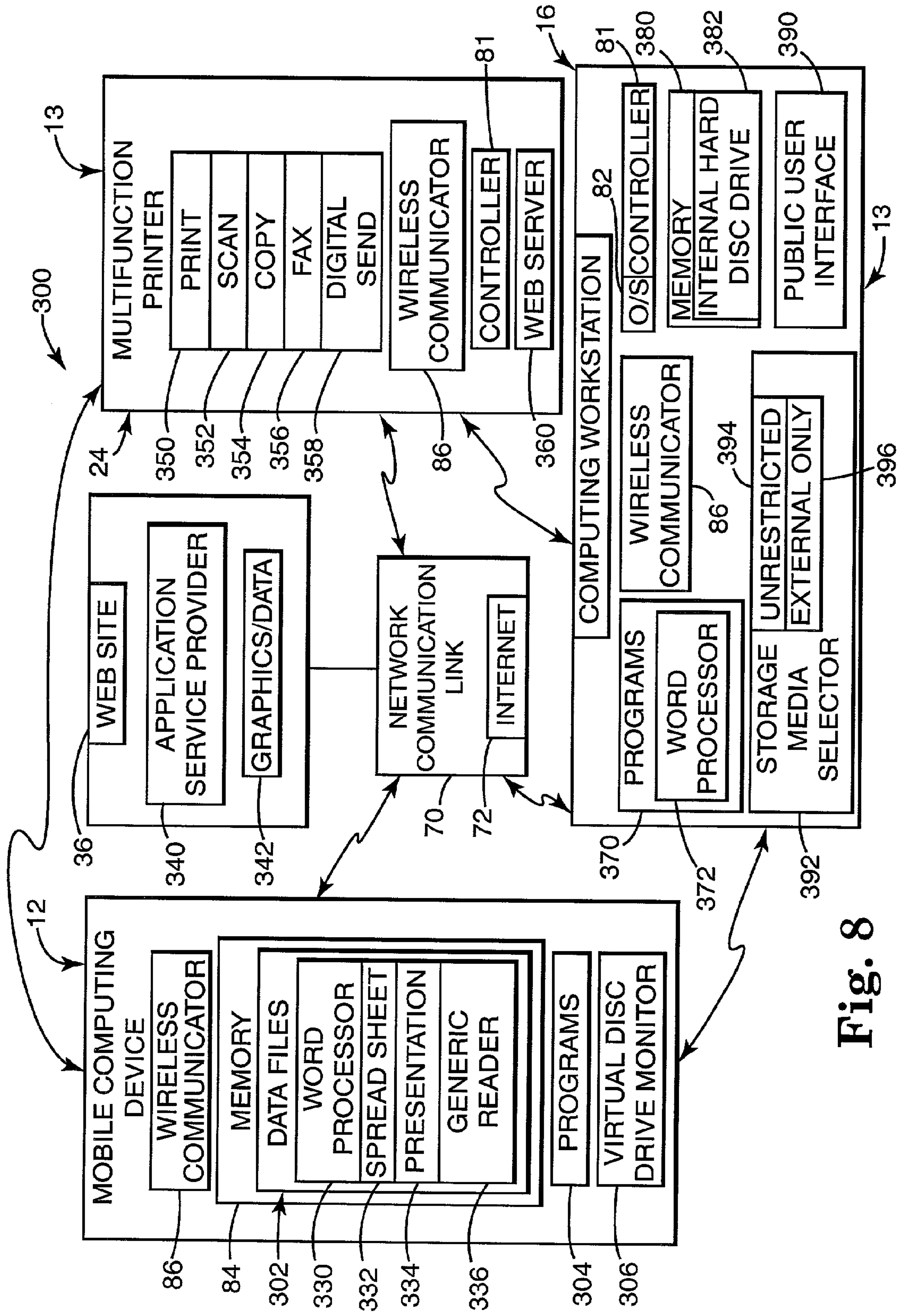
FIG. 8 is a block diagram of a multi-function printer, a computing workstation, a web site and a mobile computing device of an appliance control system, according to one embodiment of the present invention.

As shown in FIG. 8, in another aspect of the invention, an appliance control system of the present invention includes mobile computing device 12, Web site 36, multifunction printer 24, and computing workstation 16 which together function as computing subsystem 300. Subsystem 300 is not a closed system but merely a representation of just one of many combinations of appliances 13, such as computing workstation 16 and printer 24 (FIG. 2), that interact with mobile computing device 12 in a method and system of the present invention. In this aspect of the present invention, mobile computing device 12 can both supply content to, and receive content from, other computing devices.

In this arrangement, mobile computing device 12 includes the same features and attributes of mobile computing device 12 including wireless communicator 86, as previously described and illustrated in association with FIGS. 1–6. As shown in FIG. 8, mobile computing device 12 further includes data files 302 in memory 84, programs 304 and virtual disc drive monitor 306. Data files 302 include word processor files 330, spreadsheet files 332, presentation files 334 and generic reader files 336 (e.g, portable document files, PDF).

Web site 36 further includes includes application service provider 340 and graphics/data 342, which provide information, goods, and/or services to mobile computing device 12.

Multifunction printer 24 includes the following functions: print 350; scan 352; copy 354; facsimile 356; and digital sending 358. Multifunction printer 24 further includes wireless communicator 86, controller 81, and optional embedded Web server 360. Alternatively multifunction printer 24 can be replaced by a device performing any one, or more than one, of the functions 350–358. Accordingly, multifunction printer 24 also represents a stand-alone printer, stand-alone copier, stand-alone scanner, stand-alone facsimile machine and/or stand-alone digital sender, or any combination of those functions in a single device or multiple devices.

Computing workstation 16 includes controller 81 with operating system 82, wireless communicator 86, programs 370 with word processor 372, memory 380 with internal hard disk drive 382, public user interface 390, and storage media selector 392 with unrestricted access function 394 or external only access function 396.

Mobile computing device 12 exercises selective access to, and control over, any or all features of computing workstation 16, multifunction printer 24, and web site 36, to the extent permitted by those appliances 13, for performing content 16 with user preferences 18 on those appliances 13.

In one example, mobile computing device 12 acts as a mobile printer server in supplying documents and files to be printed at multifunction printer 24. In particular, anyone of the types of data files 302, such as word processing files 330, financial spreadsheet files 332, presentation files 334, and generic reader files (e.g., portable document format, PDF) 336 are supplied from memory 84 of mobile computing device 12 to multifunction printer 24 for printing at the direction of mobile computing device 12. Data monitor 202 of appliance content selector 92 (shown in FIG. 5) facilitates selection of data files 302 in memory 84 that are printed at multifunction printer 24.

In another example, mobile computing device 12 receives documents from a scanner such as scan function 352 of multifunction printer 24 for storage in memory 84 of mobile computing device 12. Document scanner receiver function 234 of data monitor 202 of appliance content selector 92 facilitates receiving and handling the documents.

In another arrangement, as further shown in FIG. 8, mobile computing device 12 optionally acts as a disc drive for computing workstation 16. In this arrangement, virtual disc drive monitor 306 of mobile computing device 12 cooperates with storage media selector 392 of computing workstation 16 via their respective wireless communicators 86 to use mobile computing device 12 substantially the same as an internal disc drive of computing workstation 16. Accordingly, as selectively controlled by mobile computing device 12, computing workstation 16 accesses data files 302 including word processor files 330, spreadsheet files 332, presentation files 334, and generic reader files 336, from memory 84 of mobile computing device 12.

In computing workstation 16, external only access function 396 of storage media selector 392 is used to restrict file retrieval and storage of computing workstation 16 to external devices such as mobile computing device 12. Alternatively, unrestricted access function 394 of storage media selector 392 in computing workstation 16 permits computing workstation 16 to perform file storage and retrieval with both external media like mobile computing device 12 and internal media such as internal disc drive 382.

This external only function 396 of storage media selector 392 of computing workstation 16, in combination with mobile computing device 12 acting as a hard drive to computing workstation 16, is particularly effective for allowing a user to use computing workstation 16 for editing of files on mobile computing device 12 without leaving a copy of the files on computing workstation 16. This feature preserves the security of files on mobile computing device 12 while permitting the owner of mobile computing device 12 to conveniently use other peoples computing workstations 16. For example, computing workstation 16 can be used to retrieve data files 302 from memory 84 of mobile computing device 12 for editing on word processor 372 of computing workstation 16.

This document editing example can be extended to a public computing environment such as an airport. For example, public user interface 390 of computer workstation 16 provides a user interface suitable for public use such as pay-for-computing station or kiosk at an airport. Public user interface 390 causes computing workstation 16 to permit only limited access to computing workstation 16 sufficient for performing basic tasks such as word processing. Accordingly, in this environment, a user could edit files on their mobile computing device 12 by walking up to the computing workstation 16 and using mobile computing device 12 as an external hard drive to wirelessly retrieve documents from data files 302 of memory 84 of mobile computing device 12. Using word processor 372 on computing workstation 16, the user can edit, email, or print the documents (using printer 24) from mobile computing device 12 without leaving a trace of those documents on the publicly located computer workstation 16.

Public user interface 390 also optionally can be used to permit a user of mobile computing device 12 to sell their user preferences 18 (FIG. 1) to a marketing association or other organization. To do so, mobile computing device 12 establishes communication with computing workstation 16 that is incorporated in a kiosk in a public venue (e.g., retail mall) and then uses public user interface 390 to transfer all or select portions of user preferences 18 (e.g. location, type and amount of last ten purchases, last ten phone calls including destination and source locations, etc.) to computing workstation 16 in exchange for an electronic payment made to mobile computing device 12 via electronic payment mechanism 98 of mobile computing device 12.

Finally, in another example, instead of supplying content 16 to an appliance 13 only from memory 84 of mobile computing device 12 or selecting content that is already available in an appliance 13, mobile computing device 12 can also obtain content from web site 36. As shown in FIG. 7, Web site 36 can supply content as part of a service of application service provider 340 and/or as providing graphics/data 342 as part of the web pages comprising web site 36. Content from web site 36 can be stored on mobile computing device 12, printed on multifunction printer 24, and/or stored on computing workstation 16.

The use of web site 36 as an appliance is not limited to use in association with computing workstation 16 and/or printer 24. Content 16 obtained from web site 36, such as portable audio files, movies, etc. can be used immediately or stored by mobile computing device 12, and then associated with user preferences 18 of mobile computing device 12 for performance by appliances 13 such as audio device 28 or video device 14.

Accordingly, mobile computing device 12 conveniently controls and/or facilitates various document handling tasks on appliances 13, such as computing workstation 16 and multifunction printer 24.

Figure 9:
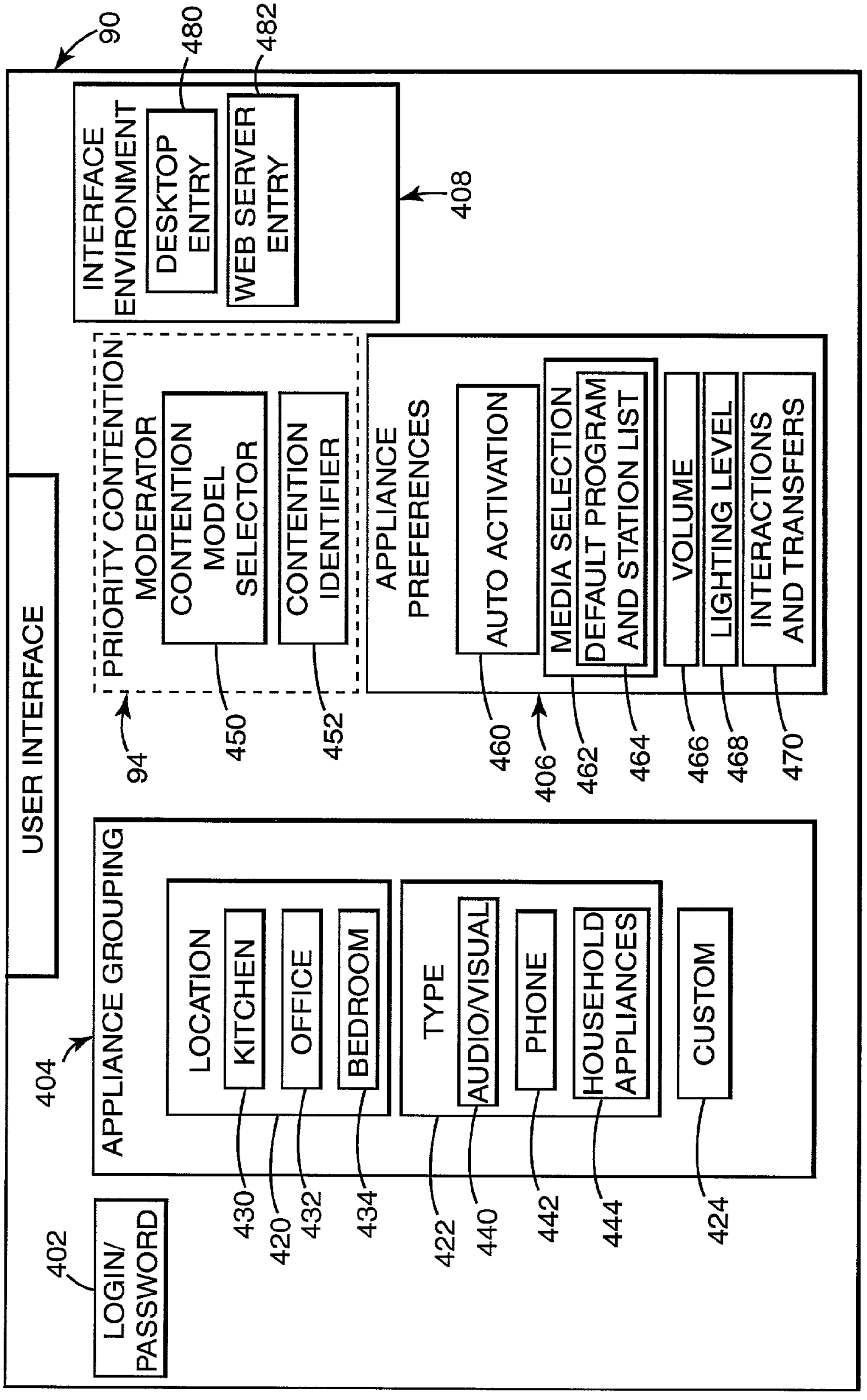
FIG. 9 is a block diagram of an user interface of an appliance control system, according to one embodiment of the present invention.

In interacting in various appliance environments such as subsystem 300 (FIG. 8), or appliances subsystems 80 and 280 shown in FIGS. 4 and 7, mobile computing device 12 operates user interface 90 to set and apply user preferences 18. As shown in FIG. 9, user interface 90 (see FIG. 4) includes login/password function 402, appliance grouping 404, appliance preferences 406, and interface environment 408. User interface 90 optionally includes priority contention moderator 94, which is later described in further detail in association with FIG. 10. User interface 90 also is understood to optionally include appliance content selector 92 that is illustrated and described in association with FIG. 5.

Given the large number and type of appliances 13 that are controllable by mobile computing device 12, user interface 90 is provided for use on both mobile computing device 12 and appliances 13 for coordinating control of appliances 13 by mobile computing device 12. Accordingly, user interface 90, including appliance content selector 92, are located on mobile computing device 12 and/or appliances 13.

Appliance grouping 404 of user interface 90 identifies a group of appliances that form a network or association in which mobile computing device 12 has authorization for controlling appliances 13. Appliance grouping 404 also can partially set the preferences or supply preference choices of mobile computing device 12. Appliance grouping 404 includes location module 420, type module 422, and custom module 424. Location module 420 permits an appliance group to be based on the location of appliances 13 such as kitchen 430, office 432 and bedroom 434. Type module 422 permits an appliance group to be based on the type of appliance 13 such as audiovisual 440, phone 442 and household appliances 444. Finally, custom function 424 permits a user, or appliance group administrator, to define which appliances define a group, how mobile computing device 12 gains access to that group, and which preferences are set for that group.

Appliance preferences 406 determines the preferences a user has for appliances 13 they will control. Appliance preferences 406 optionally include a set of preferences for when no other mobile computing devices 12 are present (i.e., the user is alone) and a different set of preferences for when other mobile computing devices 12 are present (i.e., other users are present). However, when user interface 90 is employed by appliance 13, then appliance 13 can set some preferences that will influence control of that appliance 13 by mobile computing device 12. Appliance preferences 406 includes auto activation function 460, media selection 462 with default program and station list 464, volume 466, lighting level 468, and interactions and transfers function 470. Auto-activation function 460 determines whether appliance 13 will be automatically activated in the presence of mobile computing device 12. In concert with appliance content selector 92, media selection 462 determines default content selections for appliance 13. Volume 466 and lighting level 468 determine, respectively, a desired audio volume level for content performed on mobile computing device 12 and a light level of appliance 13 when appliance 13 is so equipped. For example, volume component 466 of appliance preferences 406 optionally includes a preference to automatically increase the volume of an appliance when the user is alone (i.e. no other mobile computing devices 12 are present).

Interactions and transfers function 470 of appliance preferences 406 governs content interactions and transfers between appliances 13 and mobile computing device 12. For example, a user can set whether phone numbers stored in phone book 282 of mobile computing device 12 (see FIG. 6) are downloaded to a TIVO-based video device 14 (FIG. 4). This download feature can act as a robust backup system to maintain a secure copy of phone book 282 in the event that a virus attacks mobile computing device 12. In another example, a user can use interactions and transfers function 470 to specify that phone numbers from phone book 282 of mobile phone 26 will be automatically transferred to computing workstation 16 or to another computer such as a laptop computer.

As further shown in FIG. 9, priority contention moderator 94 (FIG. 4) is optionally included as part of user interface 90 and operates to determine priority between mobile computing devices 12 that compete for control over one or more appliances 13. Priority contention moderator 94, including contention model selector 450 and contention identifier 452, are described in greater detail in association with FIG. 10.

Finally, interface environment 408 of user interface 90 specifies how a user prefers to enter user preference information and includes desktop entry function 480 and Web server entry function 482. Desktop entry function 480 permits a user to access user interface 90 on a desktop computer, such as computer workstation 16, to manually enter the preference information. Web server entry function 482 includes controller 81 of mobile computing device 12 including embedded web server 97 (FIG. 4), i.e. that produces a web page corresponding to mobile computing device 12. The user can use another device, such as computing workstation 16 to access the web page corresponding to mobile computing device 12 and set the preferences and/or store and retrieve content on mobile computing device 12.

In short, user interface 90 facilitates control of appliances 13 by mobile computing device 12 by permitting specification of user preferences 18 and content selection, and by permitting electronic exchange of user preferences 18 and content selection to avoid manual entry of user preferences 18 and content selection.

Figure 10:
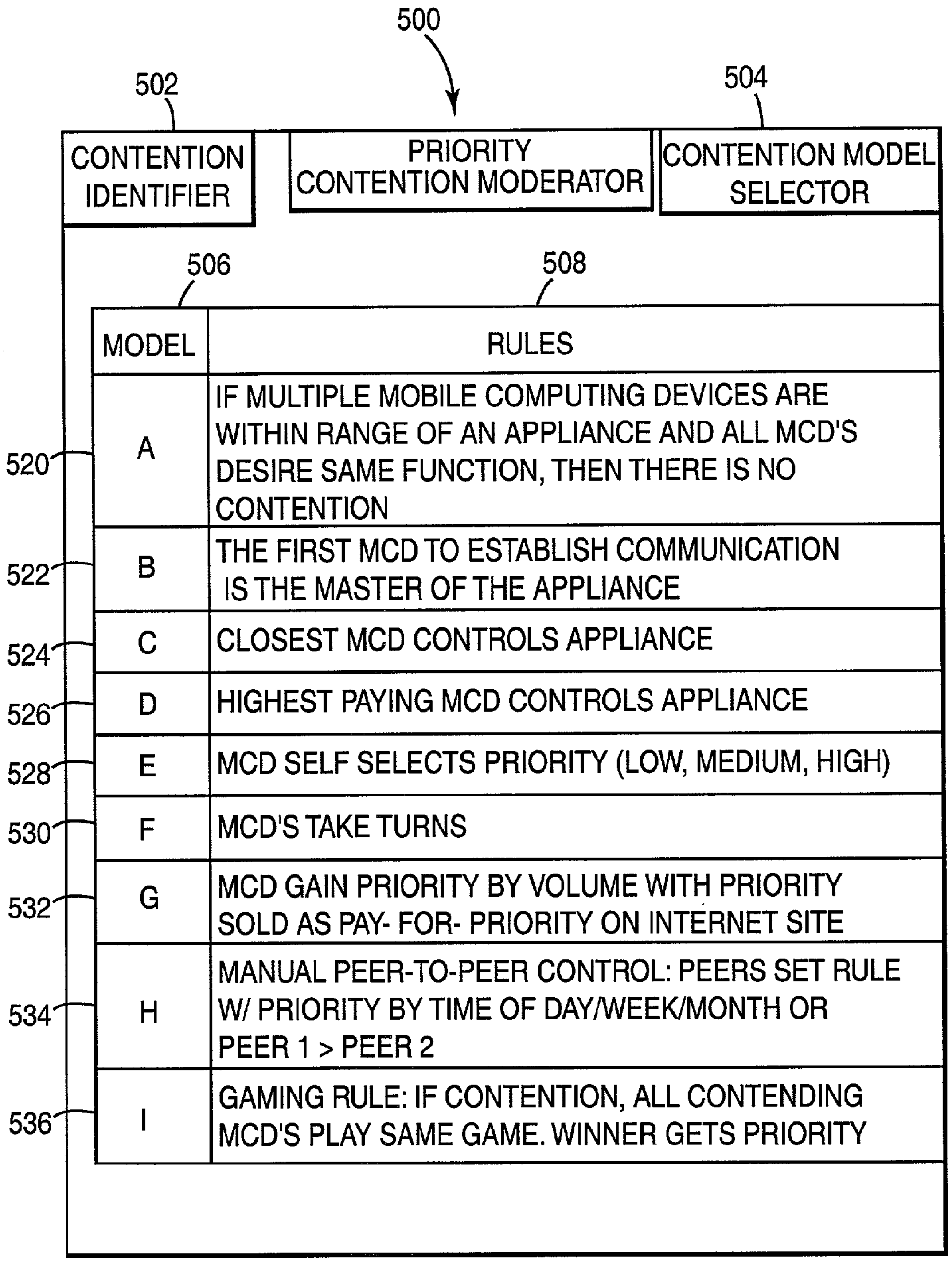
FIG. 10 is a block diagram of a priority contention moderator of an appliance control system, according to one embodiment of the present invention.

As shown in FIG. 10, priority contention moderator 94 (shown as 500) includes contention identifier 502 and contention model selector 504. Contention model selector 504 is configured to select one model of a plurality of models 506 of rules 508 for determining priority between mobile computing devices 12 that are competing for control for an appliance. Priority contention identifier 502 works in combination with wireless communicators 86 of mobile computing device 12 and of appliance 13 to determine if a competing mobile computing device 12 is present. If competing mobile computing devices 12 are present, then the selected model 506 determines priority between the computing devices.

Rule model 520 is a no contention model, in which no priority is established when multiple computing devices 12 are within range of appliance 13 and all mobile computing devices 12 select the same content, function, or user preference on appliance 13. For example, no priority is established when multiple computing devices 12 desire to watch the same movie on video device 14, such as television.

Rule model 522 is a first-in-time model in which the first mobile computing device 12 to establish communication with appliance 13 is the master of appliance 13. The master of the appliance controls activation, preferences and content of appliance 13.

Rule model 524 is a proximity model in which mobile computing device 12 that is the closest to the appliance controls appliance 13. Rule model 526 is a monetary model in which the highest-paid mobile computing device 12 controls the appliance.

Rule model 528 is a self-selection model in which each mobile computing device 12 self-selects a priority, such as low, medium or high. If multiple mobile computing devices 12 have self-selected the same priority and are adjacent the single appliance, then one of the other contention models will determine priority.

Rule model 530 is a courtesy model in which mobile computing devices 12 take turns having priority over appliance 13. In stark contrast, rule model 532 is a pay-for-priority model in which priority is gained on a purchasable volume basis from a pay-for priority Internet site. For example, the user can purchase 500 units of priority and then set a preference in their mobile computing device 12 to pay up to 300 units of priority (or any desired amount) to obtain control over an appliance. The mobile computing device 12 that offers the greatest unit volume priority for the appliance becomes the master of the appliance.

Rule model 534 is a peer-to-peer model in which two or more mobile computing devices 12 set their respective priority manually or with their own custom rules. For example, priority optionally is set by time-of-day/week/month so that one mobile computing device 12 has priority during certain times of the day, week or month. Alternatively, mobile computing devices 12 agree as to which computing device 12 carries priority over the other. For example, one courteous arrangement includes a wife's mobile computing device 12 having priority over the husband's mobile computing device 12.

Finally, rule model 536 is a gaming rule. All contending mobile computing devices play the same game on the appliance and the winner of the game gets priority over the appliance.

FIGS. 4, 7, and 8 illustrate isolated subsystems of various components of an appliance control system of the present invention. However, the components of an appliance control system of the present invention can change at the discretion of the operator of mobile computing device 12 as mobile computing device 12 moves through their environment. For example, as shown in FIG. 8, subsystem 300 included mobile computing device 12, computing workstation 16, multifunction printer 24 and website 36. By simply selecting components to be included in an appliance control system of the present invention, such as subsystem 300, or by simply walking to a different portion of a room or any other room, mobile computing device 12 can add other components to subsystem 300 such as land phone 281 (see FIG. 6) or audio device 28 and video device 14 (FIG. 4). Similarly, mobile computing device 12 can add other appliances 13, such as the appliances from household appliance set 40 (see FIG. 2). In other words, mobile computing device 12 can include or exclude as many appliances 13 as is desired to achieve an optimal control environment. The selection of which appliances to control is preferably included as one of user preferences 18 in appliance grouping function 404 of user interface 90 (FIG. 9) so that mobile computing device 12 automatically determines which appliances 13 it will control as preferred by the user of mobile computing device 12.

Appliances 13 optionally include controller 81 or some other form of logic operator for carrying out commands from mobile computing device 12 and for coordinating operation with mobile computing devices 12, such as determining priority between competing mobile computing devices 12.

The system and method of the present invention is also not limited solely to appliances geared toward personal consumption of information. Rather, user preferences 18 can be applied from mobile computing device 12 to almost anything, such as purchase of a good or service from a dispenser. For example, a gasoline pump can act as an appliance 13 in which one user preference 18 includes a preference for premium unleaded gasoline over regular unleaded gasoline. In this instance, a user can purchase gasoline with mobile computing device 12 which automatically selects premium gasoline at a gasoline pump, or selects premium gasoline if it does not cost a set price difference more than regular gasoline (e.g. 15 cents more). Using electronic payment mechanism 98, mobile computing device 12 uses credit card information or other financial institution information for making wireless payment to the gas pump. Accordingly, both the selection of the type of gasoline and payment of the transaction are carried out automatically through user preferences 18 of mobile computing device 12.

Figure 11:
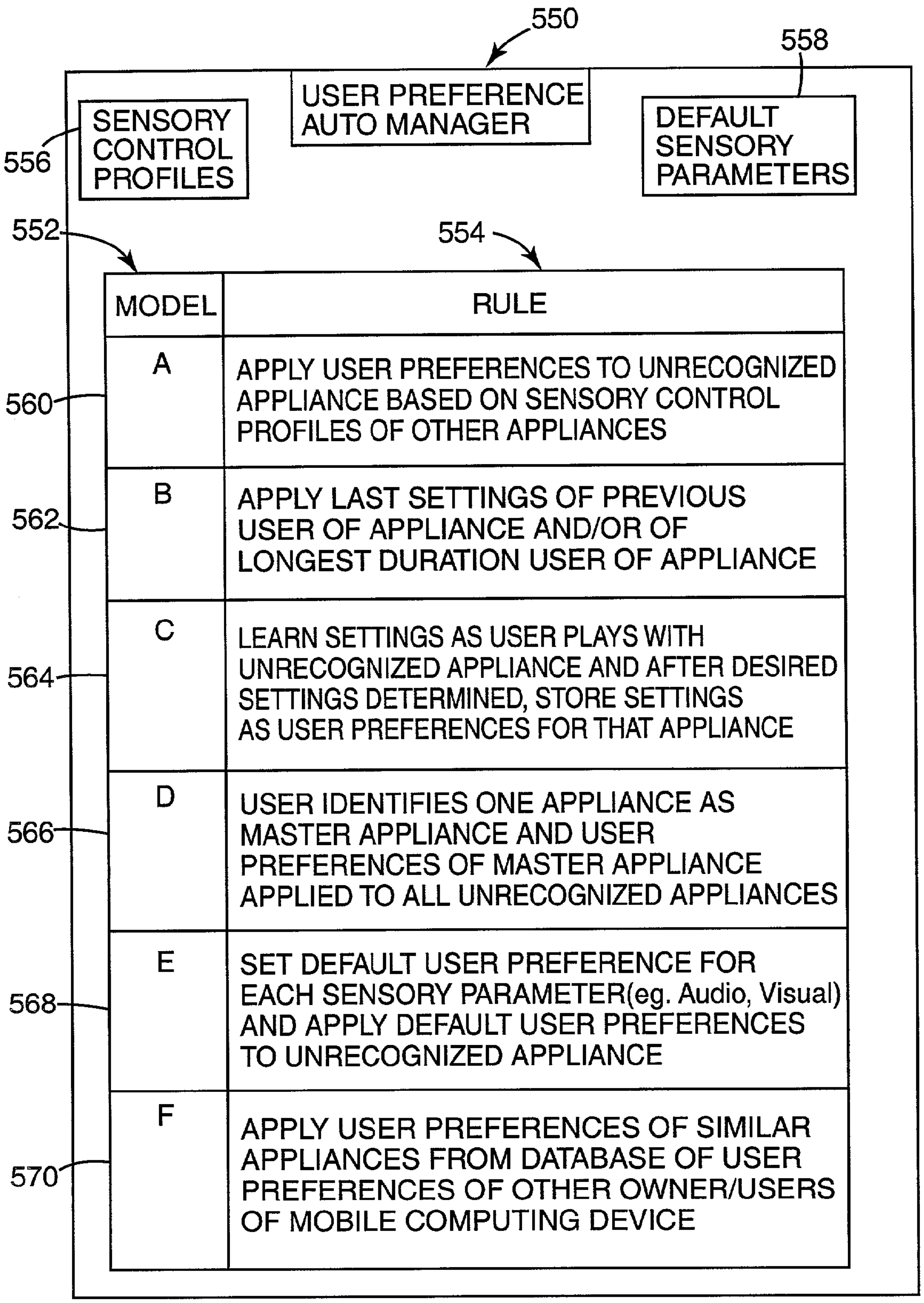
FIG. 11 is a block diagram of an user preference auto manager of an appliance control system, according to one embodiment of the present invention.

Mobile computing device 12 (FIG. 1) optionally further includes a user preference auto manager 550 as shown in FIG. 11. Auto manager 550 includes a plurality of models 552 for automatically applying user preferences to appliances 13, as expressed in rules 554. Auto manager 550 also includes sensory control profiles 556 and default sensory parameters 558, each used for implementing models 552. In particular, these models 552 are used by mobile computing device 12 to automatically apply to user preferences to appliances that are unrecognized by mobile computing device 12 so that the user/owner of mobile computing device 12 need not manually determine and set user preferences for the unrecognized appliance. An unrecognized appliance is either a new appliance (never-been-used-before) or an appliance that has been previously controlled by other mobile computing devices, but not by mobile computing device 12. Moreover, unrecognized appliances can even include an appliance previously controlled by mobile computing device 12 that has been updated with additional features or newer features not previously controlled by mobile computing device 12. Accordingly, with user preference auto manager 550 of the present invention, user preferences 18 are transposed across appliances 13 so that users can avoid manual transactions with appliances 13, effectively bypassing the user interfaces of the appliances 13.

Models 552 include sensory control model 560, last settings model 562, play-and-learn model 564, master appliance model 566, sensory parameter model 568, and similar owner model 570.

In sensory control model 560, mobile computing device 12 includes in memory 84 (or within an accessible database) a sensory control profile 556 of appliances 13 that have been previously controlled by one or more mobile computing devices 12. Sensory control profile 556 is part of user preferences 18 for each appliance 13 and identifies a desired appliance setting for each human sensory capability. For example, sensory control profile 556 for a television includes a preferred volume setting for auditory senses and a preferred color tint for visual senses. Sensory control profile 556 includes a complete set of preferred appliance settings for the full range of human sensory capabilities that are applicable for that appliance. A method for implementing sensory control model 560 is described and illustrated more completely in association with FIG. 12.

In last settings model 562, mobile computing device 12 applies the last settings on unrecognized appliance 13 (that were used by a previous user of the unrecognized appliance) as user preferences 18 for mobile computing device 12. Alternatively, mobile computing device 12 applies the settings on appliance 13 that correspond to the longest duration of use of appliance 13.

In play-and-learn model 564, the user indicates to mobile computing device 12 that user will play with the settings of unrecognized appliance 13. Mobile computing device 12 monitors the settings of appliance 13 during this play period and once the desired settings on appliance 13 are achieved by the user, mobile computing device 12 applies those settings as user preferences 18 to appliance 13 and stores those settings in memory 84 as user preferences 18 for that appliance 13.

In master appliance model 566, mobile computing device 12 is used to identify a master appliance that has a known set of user preferences. Mobile computing device 12 is instructed to apply that set of user preferences 18 to all unrecognized appliances 13.

In sensory parameter model 568, the user sets user preferences 18 to include default sensory parameters 558 in mobile computing device 12 for each human sensory capability (e.g., auditory, visual, touch, smell, etc.) independent of any particular appliance 13. For example, the auditory sensory setting includes at least a single volume setting for all appliances while the visual sensory setting includes at least a color setting and a light intensity setting. Accordingly, upon encountering an unrecognized appliance, mobile computing device 12 applies its user preferences 18 as a plurality of default sensory parameters 558 to appliance 13 simultaneously. Each default sensory parameter 558 is applied to appliance 13 independently of other default sensory parameters 558.

In similar owners model 570, upon encountering an unrecognized appliance 13, mobile computing device 12 applies user preferences 18 of similar appliances to the unrecognized appliance. In particular, as more fully described in association with FIG. 13, mobile computing device 12 obtains a set of user preferences 18 from a database of user preferences of owners of other mobile computing devices that are similar to the owner of mobile computing device 12. In particular, the similarity can focus on the tastes, habits, cultural, and socio-economic attributes between respective owners.

Figure 12:
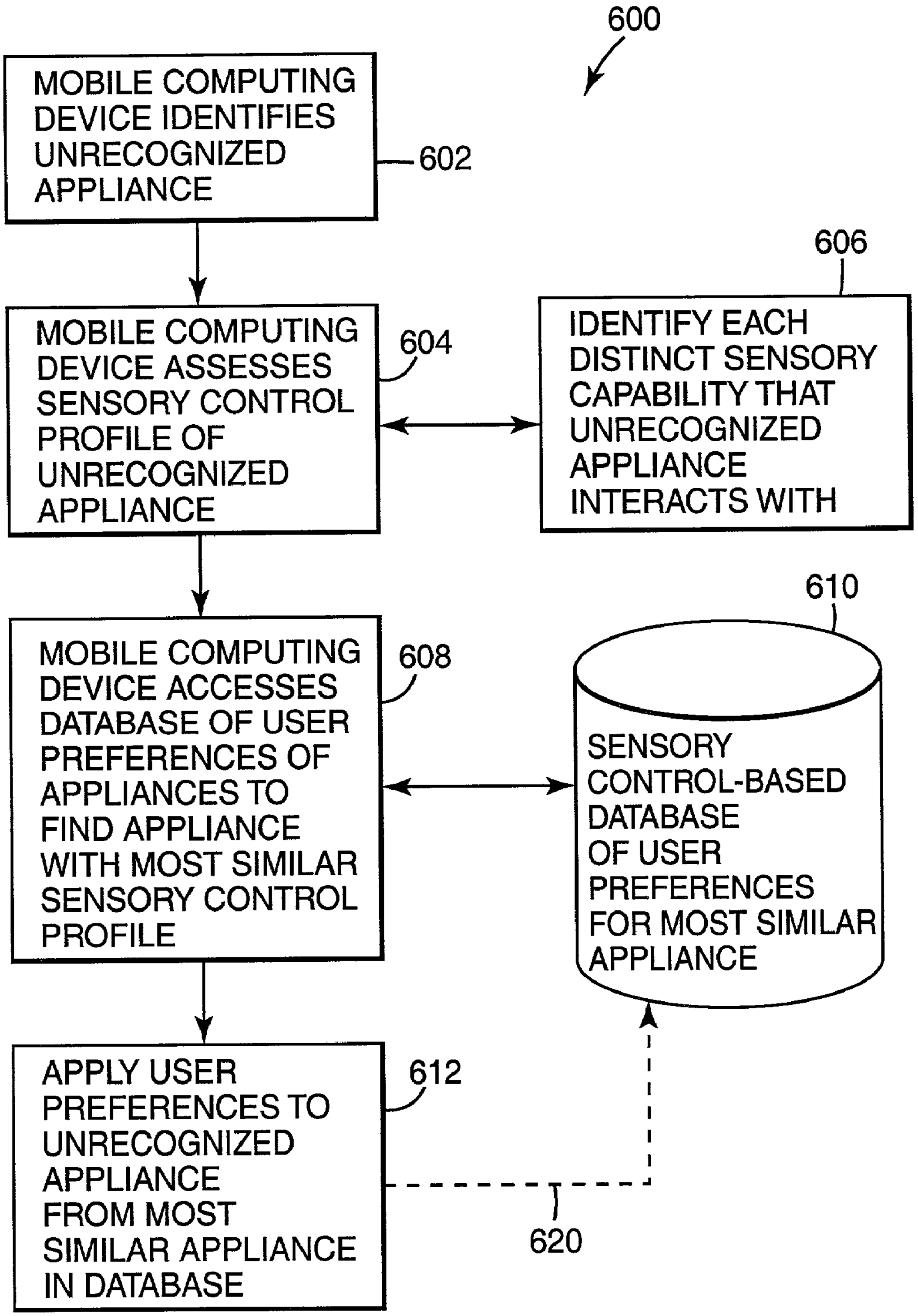
FIG. 12 is a flow diagram of a method of applying user preferences across appliances, according to one embodiment of the present invention.

As shown in FIG. 12, sensory control model 560 is more fully expressed in method 600 of applying user preferences using sensory control profiles. In a first step 602 of method 600, mobile computing device 12 identifies unrecognized appliance 13 as an appliance that has never been controlled by any mobile computing device or that has not been previously controlled by mobile computing device 12. Next, mobile computing device 12 assesses sensory control profile 556 of the unrecognized appliance (step 604). This assessment further includes identifying each distinct human sensory capability (e.g., auditory, visual, touch, etc,) that the appliance interacts with (step 606). For example, a visual sensory parameter can include preferred lighting levels and color schemes while touch sensory parameters includes air temperature, wet/dry sensations, surface temperature, etc.

After this sensory control assessment in step 606, mobile computing device 12 accesses database 610 of user preferences 18 for other appliances to find an appliance with a sensory control profile 556 that is most similar to the unrecognized appliance (step 608). In a final step 612, mobile computing device 12 applies user preferences 18 as sensory control profile 556 to unrecognized appliance 13 from the most similar appliance in database 610. In addition, an optional feedback pathway 620 stores user preferences 18 of mobile computing device 12 that are applied to unrecognized appliance 13 in database 610 for future use by other mobile computing devices 12 and appliances 13.

Figure 13:
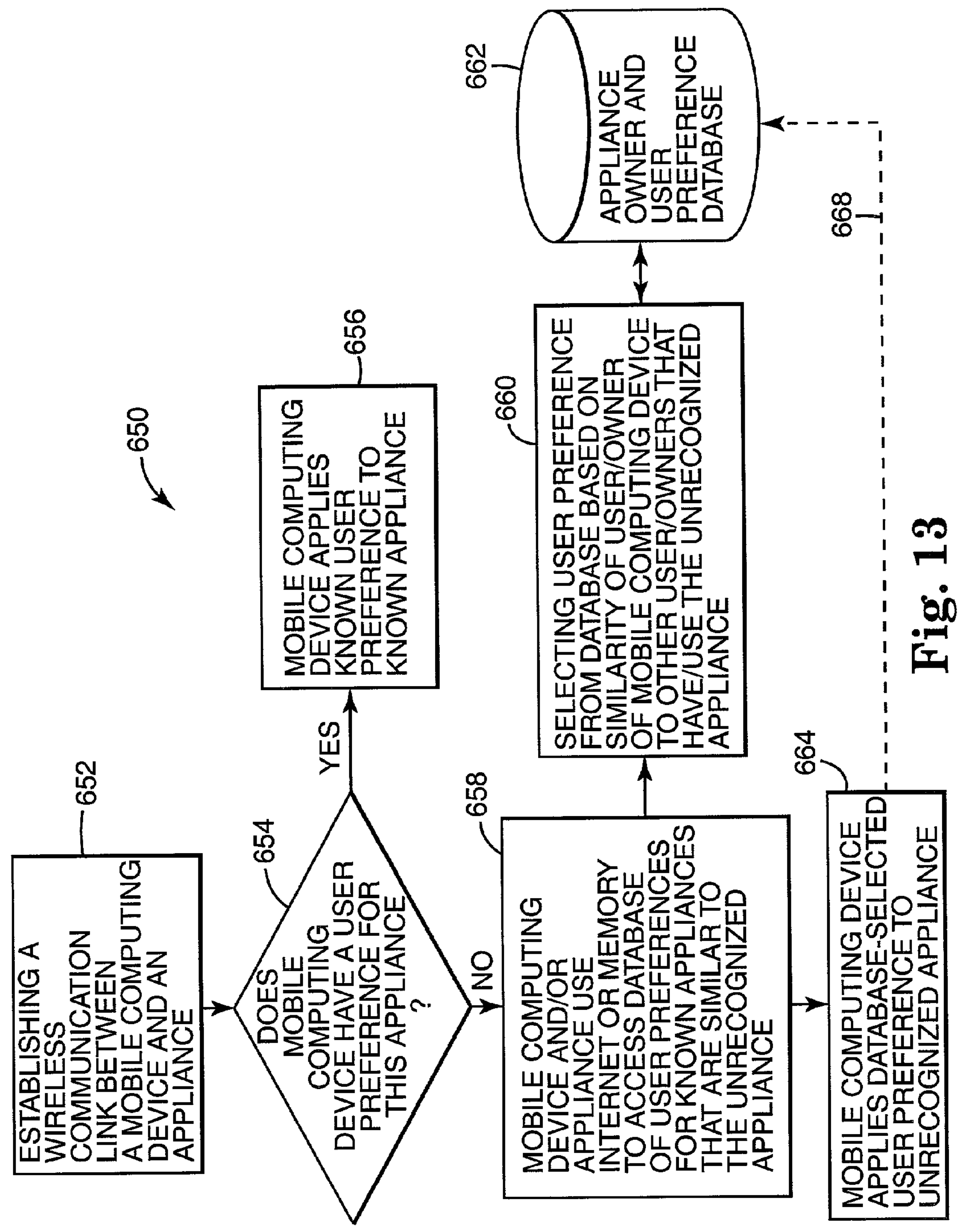
FIG. 13 is a flow diagram of a method of applying user preferences across appliances, according to one embodiment of the present invention.

Similar owner model 570 is more completely described and illustrated in association with FIG. 13 as method 650. In first step 652 of method 650, mobile computing device 12 establishes a wireless communication link with appliance 13. Mobile computing device 12 then determines whether it has a user preference 18 for appliance 13 (step 654). If the answer is yes, then step 656 includes mobile computing device 12 applying a known user preference 18 of mobile computing device 12 to appliance 13. If no user preference is known in mobile computing device 12 for appliance 13, then appliance 13 is an unrecognized appliance 13. Accordingly, in step 658, mobile computing device 12 and/or appliance 13 accesses the internet and/or memory 84 of mobile computing device 12 to access a database 662 of user preferences 18 for known appliances 13 that are similar to the unrecognized appliance 13. In particular, mobile computing device 12 selects a set of user preferences from database 662 that is based on the similarity of the user/owner of mobile computing device 12 to other users/owners of mobile computing devices that have, or use, unrecognized appliance 13 (i.e., that is unrecognized to mobile computing device 12). Once a user preference 18 of a similar owner is identified from database 662, then step 664 includes mobile computing device 12 applying the database-selected user preference 18 to new/unrecognized appliance 13. Finally, optional feedback pathway 668 permits the database-selected user preference 18 to be stored in database 662 association with user/owner of mobile computing device 12 for future use by other user/owners of mobile computing device 12. This new user preference 18 is also preferably stored in memory 84 of mobile computing devices 12 in an existing library of user preferences.

A system and method of the present invention carries numerous advantageous features. Foremost, a mobile computing device becomes the master of appliances in its environment, controlling content and user preferences. Previously, personal information, such as user preferences as well as content, was fragmented in isolation among many appliances. This information is now centralized and integrated into a single unified master controller, the mobile computing device. Moreover, selected content is performed on one or more appliances simultaneously, with performance of content switching between suitable appliances when mobile computing device moves away from one appliance toward another appliance. When performance is interrupted from one appliance by mobile computing device to be switched to another appliance, the continuity of performance of the content is maintained by the mobile computing device among and across multiple appliances.

While specific embodiments have been illustrated and described, herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A computer-readable medium having encoded computer-executable instructions for performing a method of setting and applying user preferences for controlling an appliance with a mobile computing device, the method comprising:

grouping the appliances, to carry substantially the same user preferences, by at least one of an appliance location, an appliance type and custom criteria;

automatically performing select tasks with the appliances with at least one of the following user-determined functions: volume level, lighting level, file interactions and file transfers, appliance auto-activation, and default media selections including default program and default station lists; and entering the user preferences for storage in the mobile computing device from at least one of computer workstation and another appliance via a web page of an embedded web server of the mobile computing device.

* * * * *